United States Patent [19]
Sato et al.

[11] Patent Number: 5,748,275
[45] Date of Patent: May 5, 1998

[54] LIQUID CRYSTAL DISPLAY DEVICE AND LIQUID CRYSTAL DISPLAY APPARATUS

[75] Inventors: Makiko Sato; Yuzo Hisatake; Ryoichi Watanabe; Hitoshi Hatoh, all of Yokohama, Japan

[73] Assignee: Kabushiki Kaisha Toshiba, Kawasaki, Japan

[21] Appl. No.: 566,038

[22] Filed: Dec. 1, 1995

[30] Foreign Application Priority Data

Dec. 1, 1994 [JP] Japan .................................. 6-298496

[51] Int. Cl.$^6$ .................................................. G02F 1/1343
[52] U.S. Cl. .................................................. 349/144
[58] Field of Search .................................. 349/143, 144, 349/180, 136

[56] References Cited

U.S. PATENT DOCUMENTS

| | | | |
|---|---|---|---|
| 5,084,778 | 1/1992 | DeJule et al. | 359/87 |
| 5,233,449 | 8/1993 | Shioji et al. | 359/68 |
| 5,434,690 | 7/1995 | Hisatake et al. | 349/143 |

*Primary Examiner*—William L. Sikes
*Assistant Examiner*—James Dudek
*Attorney, Agent, or Firm*—Cushman Darby & Cushman IP Group of Pillsbury Madison & Sutro LLP

[57] ABSTRACT

A liquid crystal display device including a first substrate supporting a plurality of pixels, each having an electrode, a second substrate having an electrode and arranged such that the electrode of the first substrate opposes the electrode of the second substrate, a nematic liquid crystal composition layer held between the first and second substrates, and aligning films for aligning liquid crystal molecules of the nematic liquid crystal composition in one direction on surfaces of the first and second substrates, wherein the electrode of the first substrate in each pixel includes a plurality of conductive layers each having a width of 50 μm or less, and a distance between the conductive layers being 50 μm or less, and at least two of the plurality of conductive layers being electrically connected in at least part of an area in the pixel, the electrode of the second substrate consists of a continuous conductive film, and a distance RS between the conductive layers and a distance D between the electrode of the first substrate and the electrode of the second substrate satisfy the following inequality.

$$\tan(\pi/9) \leq RS/2D \leq \tan(7\pi/18)$$

24 Claims, 15 Drawing Sheets

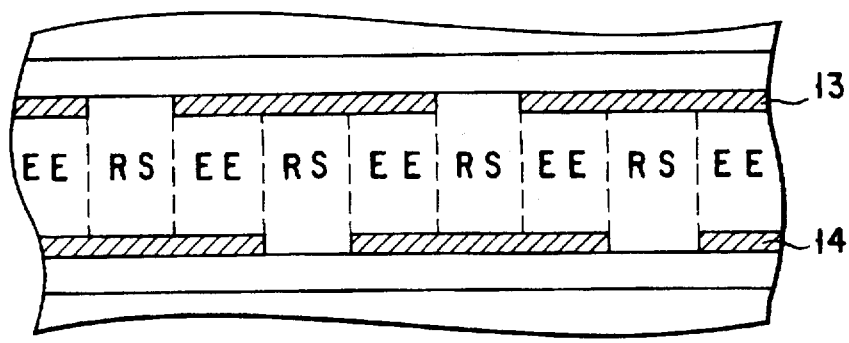
F I G. 6
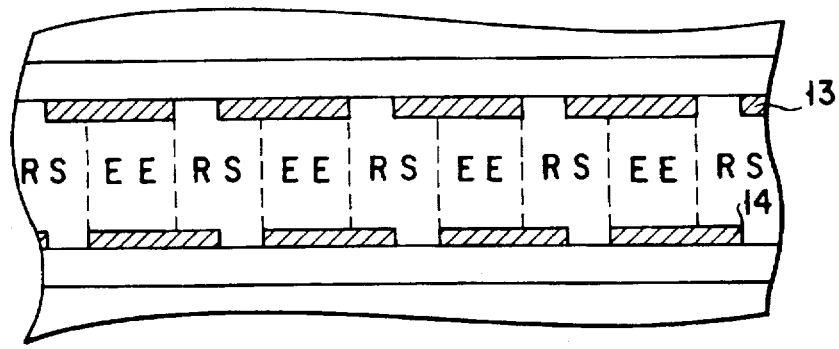
F I G. 7
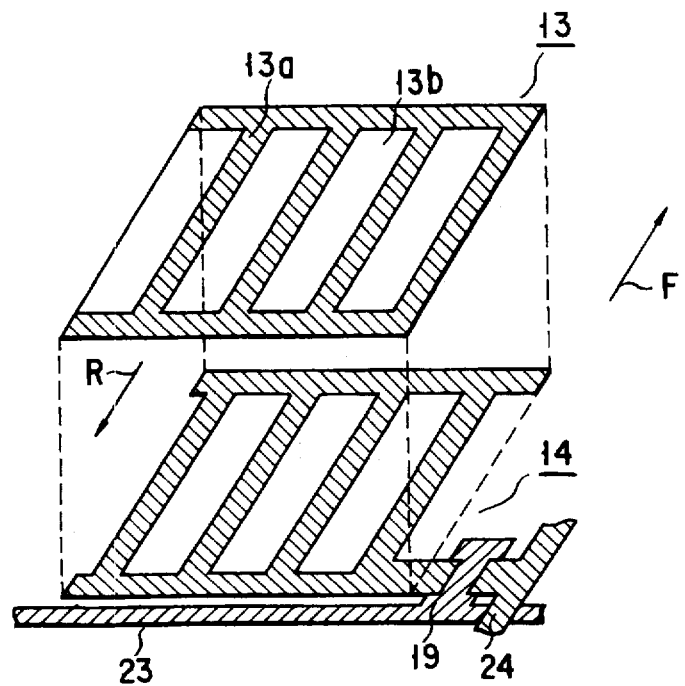
F I G. 11

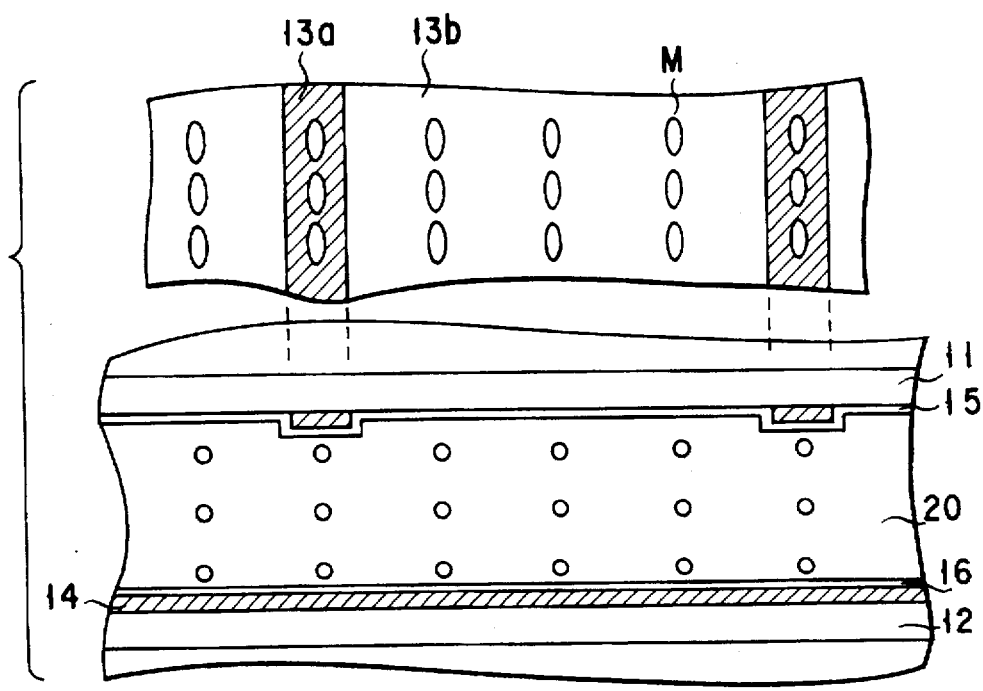
F I G. 8A
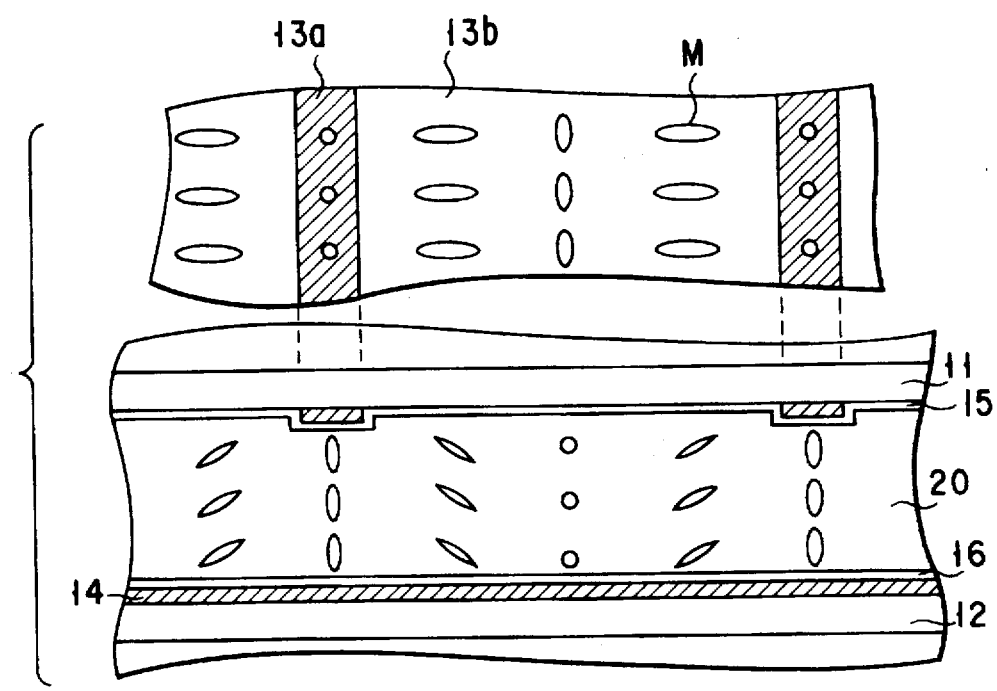
F I G. 8B

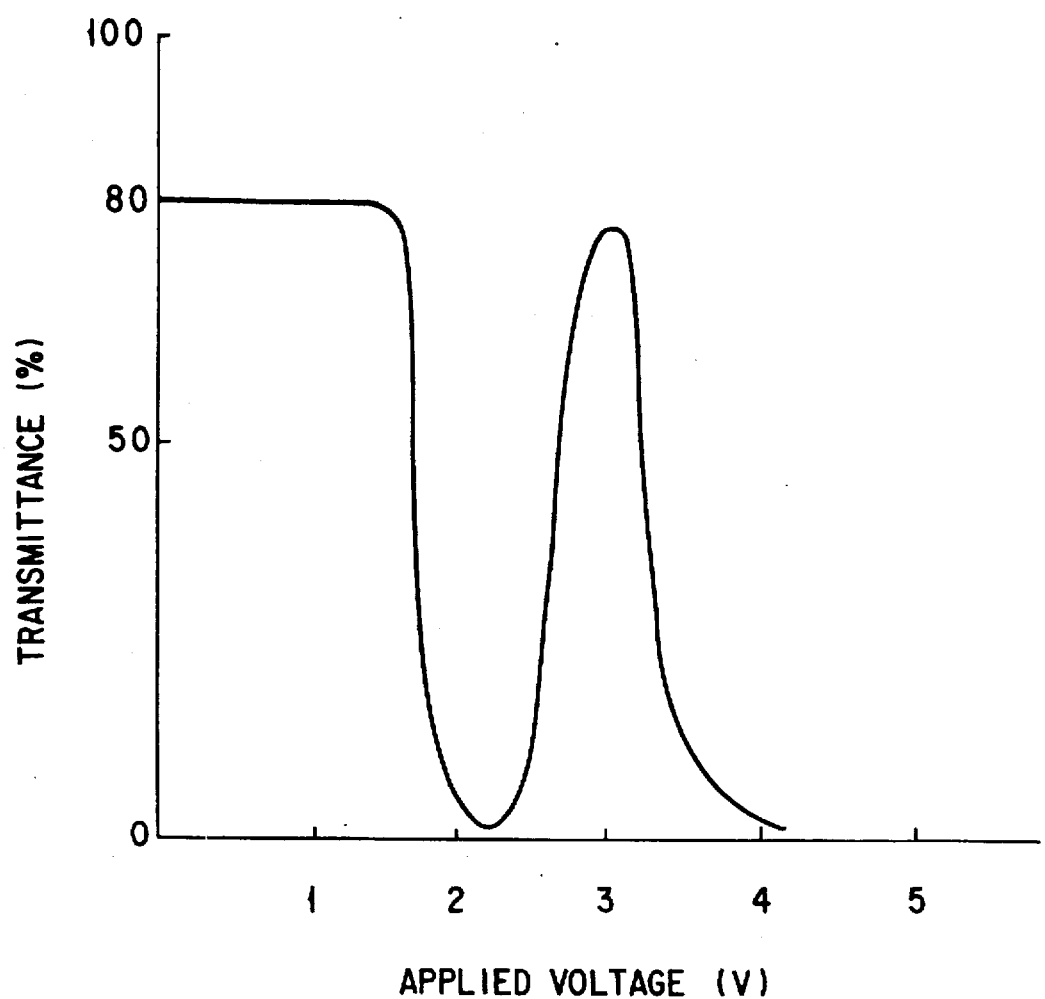
F I G. 22

LIQUID CRYSTAL DISPLAY DEVICE AND LIQUID CRYSTAL DISPLAY APPARATUS

BACKGROUND OF THE INVENTION

1. Field of the Invention

The present invention relates to a new liquid crystal display device and a liquid crystal display apparatus having the same.

2. Description of the Related Art

In recent years, liquid crystal display devices (to be abbreviated as an LCDs hereinafter) are popularly used for wordprocessors, personal computers, projection TVs, compact TVs, and the like.

An LCD performs display by controlling a change in brightness of light. As such light control techniques, there are a technique for combining the polarization effect of liquid crystal molecules with polarizers, a technique using phase transition of a liquid crystal and scattering/transmission of light, a technique for adding a dye to a liquid crystal to use a change in color density caused by controlling the visible light absorption amount of the dye, and the like.

An LCD using the technique for combining the polarization effect with polarizers is a twisted nematic (TN) LCD having a molecular alignment twisted by 90°, which can control polarization by a thin liquid crystal layer and a low voltage in principle. For this reason, the TN-LCD exhibits a high contrast ratio at a high response and a low power consumption. The TN-LCDs are applied to timepieces, desktop calculators, and the like using simple matrix driving, or full-color display liquid crystal TVs by using active matrix driving with a switching element provided in units of pixels, or a combination with color filters.

However, an LCD which combines the polarization effect with polarizers uses polarizing plates in principle, so the transmission light amount of the LCD largely decreases. More specifically, since at least one polarizing plate is used, the transmission light amount decreases to at least 50% or less. In addition, the display color or contrast ratio largely changes in accordance with the viewing angle/direction because of the direction of the liquid crystal molecular alignment. Therefore, the LCD has a dependency on viewing angle. In addition to this dependency on viewing angle, the transmittance represented by the ratio of an incident light amount to a transmission light amount is low. In fact, TN-LCDs have not completely surpassed cathode-ray tubes (CRTs) in display performance.

LCDs which use phase transition of a liquid crystal or control the visible light absorption amount of a dye are exemplified as LCDs using a PC liquid crystal in which phase transition from a cholesteric phase with helical molecular alignment to a nematic phase with homeotropic molecular alignment occurs upon application of an electric field, and LCDs using a White-Taylor GH liquid crystal formed by adding a dye to liquid crystal molecules. These LCDs use no polarizing plate in principle, so the transmittance does not decrease. In addition, these LCDs have wide viewing angles and are applied to automotive equipments or projection-type displays.

However, such LCDs cannot obtain sufficient light scattering unless the liquid crystal layer is made relatively thick, or the helical strength of liquid crystal molecules is increased. This is because light scattering depends on various liquid crystal molecular alignment modes. More specifically, to obtain sufficient light scattering in, e.g., a cholesteric phase with helical molecular alignment, helical axes must be set in all directions with respect to the direction of incident light. To set helical axes in many directions, the liquid crystal layer must be thick. For this reason, such an LCD requires a high driving voltage while its response is very low. Therefore, it is difficult to apply such an LCD to a display device with a large display amount (number of pixels). Since the transmittance abruptly changes in accordance with an increase in applied voltage, gradation display is also difficult.

The liquid crystal molecular alignment in a light scattering state largely differs from that in a light transmission state. For this reason, when shift between the light scattering state and the light transmission state is controlled by electric field control, a hysteresis is observed in the electrooptic characteristics. There are various views for the cause of hysteresis, and it is not necessarily clarified. As is known, a hysteresis tends to occur when the liquid crystal molecular alignment largely changes, or when the light scattering state (a state wherein the liquid crystal molecular alignment is constituted by a set of fine domains) is set by liquid crystal molecules in a voltage non-application state.

As described above, when a hysteresis occurs in applied field vs. transmittance characteristics, multiplex driving becomes difficult, resulting in a problem in practical use.

As other LCDs using phase transition of a liquid crystal, LCDs using an Nn liquid crystal in which a conductive material such as an organic electrolyte is dissolved, which obtain scattering by applying a high voltage at a low frequency (generally called a DS effect) or by utilizing a thermooptic effect, have been proposed. However, these LCDs also have the above problem.

Additionally, polymer-dispersed LCDs have been proposed, which use a capsule structure as shown in FIG. 1A in which a lot of capsules are formed in a polymer 3 sandwiched between substrates 1 and 2, and a liquid crystal 4 is sealed in the capsules, or a fibrous polymer structure as shown in FIG. 1B in which a liquid crystal 6 is dispersed in a fibrous polymer 5, thereby increasing light scattering properties.

However, such a polymer-dispersed LCD has a limitation in a shape of polymer or a mixing ratio of polymer and a liquid crystal layer because of its manufacturing method and principle. In addition, since an externally applied voltage is divided to the polymer and the liquid crystal, only part of the applied voltage is applied to the liquid crystal. In fact, when desired driving characteristics such as a sufficiently low driving voltage and a high response are to be satisfied, sufficient light scattering properties cannot be obtained.

In these techniques as well, the liquid crystal molecular alignment in the light scattering state largely differs from that in the light transmission state, and a hysteresis occurs in electrooptic characteristics, as described above. When the liquid crystal molecular alignment in the light scattering state is controlled to some extent (e.g., a hydrophobic substance is mixed with a polymer to control the liquid crystal molecular alignment in capsules), the hysteresis can be decreased. However, this simultaneously degrades light scattering properties, resulting in a problem in practical use.

The polymer-dispersed LCDs have the same problem as that of other LCDs using phase transition.

To scatter light, a technique can also be considered in which aligning treatment is performed in units of small regions such that liquid crystal molecules are aligned in various directions on the surfaces of two substrates with electrodes, and a liquid crystal is held in a gap between the opposing inner surfaces of the substrates. However, it is actually difficult to change the alignment direction (e.g., rubbing direction) in units of small regions, and the above problem of hysteresis cannot be solved.

As described above, the conventional LCDs have a low transmittance and dependency on narrow viewing angle, or require a high driving voltage, and its response is low.

SUMMARY OF THE INVENTION

It is an object of the present invention to provide a new liquid crystal display device which obtains satisfactory light scattering characteristics and gradation display properties at a low driving voltage with a high brightness level and a high contrast ratio and prevents display inversion in gradation display.

It is another object of the present invention to provide a liquid crystal display apparatus having the above liquid crystal display device.

According to the present invention, there is provided a liquid crystal display device comprising a first substrate supporting a plurality of pixels, each having an electrode, a second substrate having an electrode and arranged such that the electrode of the first substrate opposes the electrode of the second substrate, a nematic liquid crystal composition layer held between the first and second substrates, and means for aligning liquid crystal molecules of the nematic liquid crystal composition in one direction on surfaces of the first and second substrates, wherein the electrode of the first substrate in each pixel includes a plurality of stripe-shaped conductive layers each having a width equal to or smaller than 50 µm, a distance between the conductive layers being equal to or smaller than 50 µm, and at least two of the plurality of conductive layers being electrically connected in at least part of an area in the pixel, the electrode of the second substrate consists of a continuous conductive film, and a distance RS between the conductive layers and a distance D between the first substrate and the electrode of the second substrate satisfy the following inequality:

$$\tan(\pi/9) \leq RS/2D \leq \tan(7\pi/18)$$

According to the present invention, there is also provided a liquid crystal display device comprising a first substrate supporting a plurality of pixels, each having an electrode, a second substrate having an electrode and arranged such that the electrode of the first substrate opposes the electrode of the second substrate, a nematic liquid crystal composition layer held between the first and second substrates, and means for aligning liquid crystal molecules of the nematic liquid crystal composition in one direction on surfaces of the first and second substrates, wherein the electrode of the first substrate in each pixel includes a plurality of first stripe-shaped conductive layers each having a width equal to or smaller than 50 µm, a distance between the first conductive layers being equal to or smaller than 50 µm, and at least two of the plurality of first conductive layers being electrically connected in at least part of an area in the pixel, the electrode of the second substrate in each pixel includes a plurality of second conductive layers each having a width equal to or smaller than 50 µm, distance between the second conductive layers being equal to or smaller than 50 µm, the second conductive layers extending in the same direction as that of the first conductive layers, and at least two of the plurality of second conductive layers being electrically connected in at least part of an area in the pixel, the first conductive layers and the second conductive layers are shifted from each other in a direction of width without opposing each other, the liquid crystal composition layer includes a layer portion FE sandwiched between each first conductive layer and part of a corresponding portion between the second conductive layers, a layer portion SS adjacent to the layer portion FE and sandwiched between part of a portion between the first conductive layers and part of a corresponding portion between the second conductive layers, and a layer portion RE adjacent to the layer portion SS and sandwiched between part of a portion between the first conductive layer and a corresponding portion of the second conductive layers are periodically repeated in an order of FE, SS, RE, FE, SS, RE, ..., and the width SS of the layer portion SS and a distance D between the electrode of the first substrate and the electrode of the second substrate satisfy the following inequality:

$$\tan(\pi/9) \leq SS/D \leq \tan(7\pi/18)$$

According to the present invention, there is also provided a liquid crystal display apparatus comprising the above liquid crystal display device, means for causing light to have an angle of less than 10 deg with respect to a normal direction of a device plane and to be incident on the liquid crystal display device, means for controlling the incident light by the liquid crystal display device, and an optical system for projecting light in a same direction of propagation as directions of the controlled light.

According to the present invention, there is also provided a liquid crystal display apparatus comprising the above liquid crystal display device, means for causing light to have an angle of less than 10 deg with respect to a normal direction of a device plane and to be incident on the liquid crystal display device, means for controlling the incident light by the liquid crystal display device, and an optical system for projecting light in a same direction of propagation as directions of the controlled light.

According to the present invention, there is also provided a projection-type display apparatus comprising a display panel consisting of the above liquid crystal display device and having an optical modulation layer for controlling a light transmittance, a light source optical system for guiding a source light beam from a light source to the display panel, and a projection optical system for projecting a modulated light beam optically modulated by the display panel onto a screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a sectional view showing a structure in which regions EE and RS are alternately arranged;

FIG. 7 is a sectional view showing another structure in which the regions EE and RS are alternately arranged;

FIGS. 8A and 8B show plan and sectional views of the liquid crystal cell of the LCD according to the first embodiment of the present invention in the voltage application and non-application states;

FIG. 11 is a perspective view showing the patterns of the upper and lower electrodes of an LCD according to the second embodiment of the present invention;

FIG. 22 is a graph showing the electrooptic characteristics of an LCD according to Example 6.

DETAILED DESCRIPTION OF THE PREFERRED EMBODIMENTS

Figure 1A:
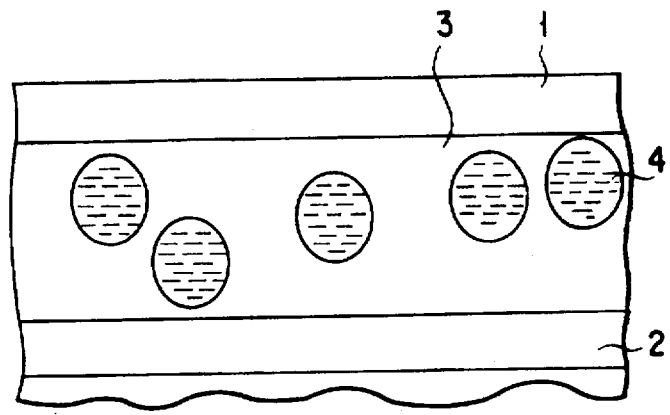
FIGS. 1A and 1B are views for explaining polymer-dispersed LCDs.
Figure 1B:
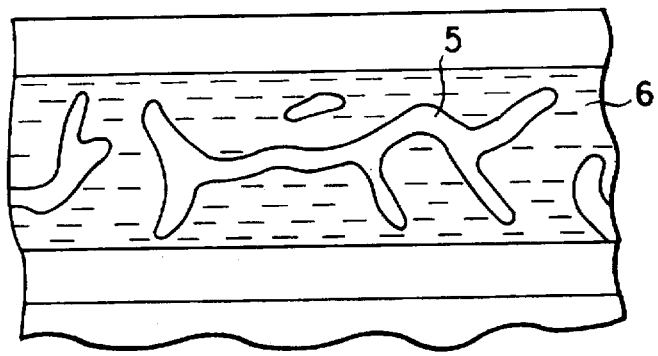

An LCD according to the first embodiment of the present invention is constituted by sandwiching a nematic liquid crystal composition between two opposing substrates with electrodes. Of the two substrates with electrodes, one has an electrode pattern in units of pixels, in which a plurality of striped conductive portions and a plurality of striped non-conductive portions (space between the conductive portions) each having a width of 50 µm or less are alternately arranged. The other has an electrode consisting of a continuous conductive portion. At least two of the plurality of conductive portions are electrically connected in at least part of an area in the pixel at least in units of pixels. The electrode structure satisfies a relation $\tan(\pi/9) \leq RS/2D \leq \tan(7\pi/18)$ where D is the interelectrode distance between the two opposing substrates, and RS is the width of the non-conductive portion (space between the conductive portions). A means for aligning liquid crystal molecules in one direction on the substrate surfaces is arranged.

An angle in $\tan(\pi/9)$ and $\tan(7\pi/18)$ is represented in radian. Either the conductive portion or the non-conductive portion can be arranged at the start in one pixel.

The LCD according to the first embodiment can have an electrode structure for satisfying a relation $\tan(\pi/4) \leq RS/2D \leq \tan(7\pi/18)$. The above LCD can also have an electrode structure for satisfying a relation $D/2 \leq EE \leq 3D$ where EE is the width of the conductive portion. In addition, the above LCD can have an electrode structure for satisfying a relation $RS/3 \leq EE \leq 1.1 \times RS$ when the liquid crystal composition has a negative dielectric anisotropy, or an electrode structure satisfying a relation $0 \leq EE \leq RS$ when the liquid crystal composition has a positive dielectric anisotropy. Furthermore, the above LCD can have an electrode structure for satisfying a relation $2.5 \text{ µm} \leq EE+RS \leq 36 \text{ µm}$.

An LCD according to the second embodiment of the present invention is constituted by sandwiching a nematic liquid crystal composition between two opposing substrates with electrodes. Each electrode of the two substrates with electrodes consists of conductive portions and non-conductive portions each having a width of 50 µm or less in units of pixels. As for the sectional shape of the two substrates along the normal direction of the LCD, a width RE where only one substrate with electrode has a conductive portion, a width FE where only the other substrate has a conductive portion, and a width SS where both the substrates have non-conductive portions are alternately arranged in an order of RE, SS, FE, SS, RE, SS, FE, SS, . . . while the widths RE and FE are alternately arranged while sandwiching the width SS therebetween. The widths RE and FE are electrically connected in part of the pixel at least in units of pixels. The electrode structure satisfies a relation $\tan(\pi/9) \leq SS/D \leq \tan(7\pi/18)$ where D is the interelectrode distance between the opposing substrates. A means for aligning liquid crystal molecules in one direction on the substrate surfaces is arranged. The angle is represented in radian, as in the first LCD. Any of the regions RE, SS, and FE can be arranged at the start in one pixel. The second LCD has an electrode structure for satisfying relations $D/2 \leq RE \leq 3D$ and $D/2 \leq FE \leq 3D$. The above LCD also has an electrode structure for satisfying relations $0.9 \times SS \leq RE \leq 1.1 \times SS$ and $0.9 \times SS \leq FE \leq 1.1 \times SS$. The above LCD also has an electrode structure for satisfying relations $2.5 \text{ µm} \leq RE+SS \leq 36 \text{ µm}$ and $2.5 \text{ µm} \leq FE+SS \leq 36 \text{ µm}$.

In the LCD according to the first or second embodiment of the present invention, the liquid crystal molecular alignment of the liquid crystal composition sandwiched between the two substrates with electrodes is a homogeneous alignment in which the longitudinal liquid crystal molecular axis is set parallel to the stripe direction of the striped electrode consisting of the conductive portions and the non-conductive portions, or a vertical alignment in which the longitudinal liquid crystal molecular axis is vertically between the two substrates with electrodes.

Incident light consists of a visible range, and the product of an index anisotropy $\Delta n$ of the liquid crystal composition and a thickness d of the liquid crystal layer satisfies a relation $350 \text{ nm} \leq \Delta n \cdot d \leq 1,050 \text{ nm}$. Alternatively, incident light is monochromatic light having a bandwidth of 100 nm or less, and the product of the index anisotropy Δn of the liquid crystal composition and the thickness d of the liquid crystal layer satisfies a relation (λ−50)/2 nm≦Δnd≦2(λ+50) nm where λ is the center wavelength of the monochromatic light. The wavelength of incident light consisting of the visible range is preferably 400 nm to 700 nm.

A liquid crystal display apparatus of the present invention uses the LCD according to the first or second embodiment and comprises a means for causing light having an angle less than 10 deg with respect to a normal direction of an element plane on the LCD, a means for controlling the incident light in the LCD, and a means using an optical system for projecting light in one direction of propagation directions of the controlled light. In addition, a means using a plurality of LCDs to cause light beams obtained by splitting and excluding at least one of red, blue, and green wavelengths to be incident on the plurality of LCDs, respectively.

The liquid crystal display apparatus also has a layer having the same optical function as that of a convex lens and arranged in the substrate on an outer surface on the incident light side of the LCD in correspondence with each pixel of the LCD. In addition, a layer having the same optical function as that of a convex lens or a concave lens is arranged between the electrode of the substrate on the incident light side of the LCD and the layer having the same optical function as that of a convex lens. A light beam transmitted through the layer having the same optical function as that of a convex lens and the layer having the same optical function as that of a convex lens or a concave lens has an angle with respect to the normal direction of the plane of the LCD, which angle is 0.9 to 1.1 times that of the incident light with respect to the normal direction of the plane of the LCD.

The LCD of the present invention realizes a light transmission state by effectively uniformly aligning molecules in each pixel, and realizes a light scattering state by obtaining a refractive lens effect or a diffraction grating effect by setting two or more field directions. The refractive lens effect is an effect for refracting incident light, which is obtained when the liquid crystal molecules continuously change the tilt angle in the direction of thickness of the liquid crystal layer to continuously change the refractive index in the liquid crystal layer. The diffraction grating effect is an effect for scattering parallel light by forming a diffraction grating in the liquid crystal layer, which is obtained when an extraordinary light refractive index $n_e$ and an ordinary light refractive index no of the liquid crystal molecules alternately regularly appear on the liquid crystal plane. Although the present inventors have already proposed a new LCD based on such a principle (Japanese Patent Application No. 6-172935), the present invention further improves the various characteristics of the conventional LCD. This will be described below.

A light scattering state by the refractive lens effect or the diffraction grating effect is obtained by forming a wall-like molecular alignment at the boundary between the two or more field directions.

Figure 2A:
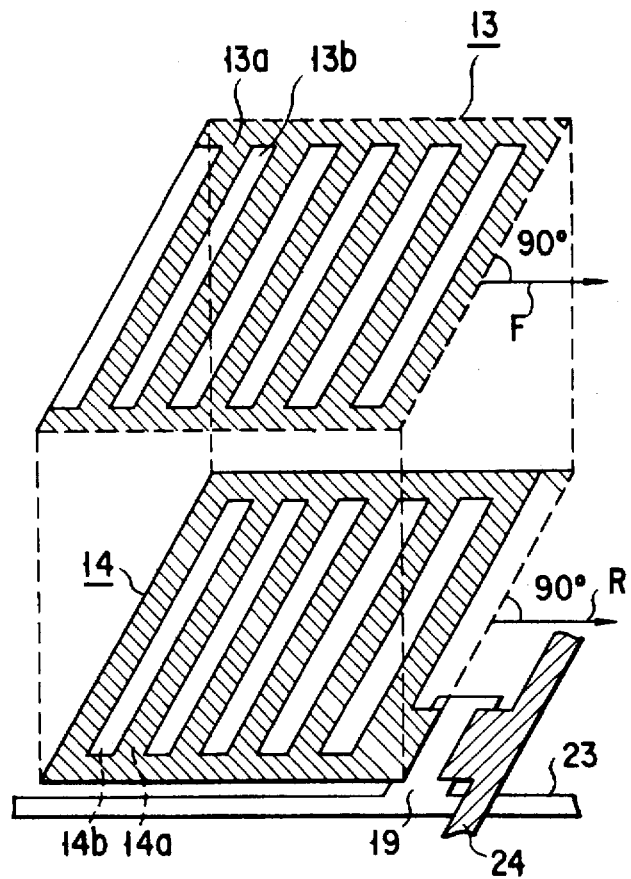
FIG. 2A is a perspective view showing the patterns of the upper and lower electrodes of a conventionally proposed LCD.
Figure 2B:
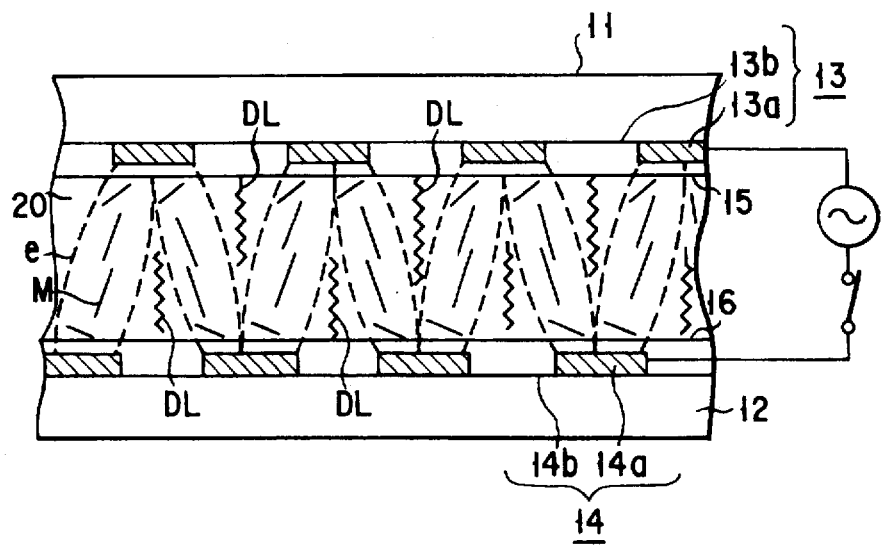
FIG. 2B is a sectional view of a liquid crystal cell of the conventionally proposed LCD in a voltage application state.

FIG. 2A shows an electrode structure in one pixel of the prior art, and FIG. 2B shows a molecular alignment. The molecular alignment shown in FIG. 2B is a splay alignment which is characterized in that the liquid crystal molecules have almost the same pretilt angle on the upper and lower substrate surfaces. This molecular alignment is observed upon application of a voltage. More specifically, electrodes 13 and 14 each forming a plurality of stripes in units of pixels are arranged on upper and lower substrates 11 and 12, respectively. Conductive portions 13a and 14a and non-conductive portions 13b and 14a of the respective electrode are arranged at an equal interval and oppose while being shifted by a ½ pitch. Upper and lower aligning films 15 and 16 are aligned in the same direction. Liquid crystal molecules M in a liquid crystal layer 20 are aligned in a splay alignment. When a voltage is applied to the upper and lower electrodes 13 and 14, an oblique field e is formed.

The behavior of the liquid crystal molecules observed when an oblique field is applied to the splay alignment will be described below with reference to FIGS. 3A to 3F.

Figure 3A:
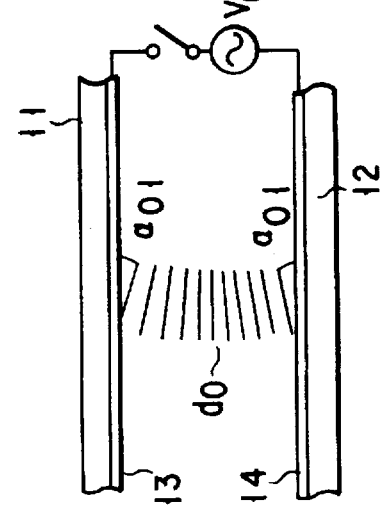
FIGS. 3A to 3F are sectional views for explaining the behavior of liquid crystal molecules in splay alignment in voltage application and non-application states.
Figure 3B:
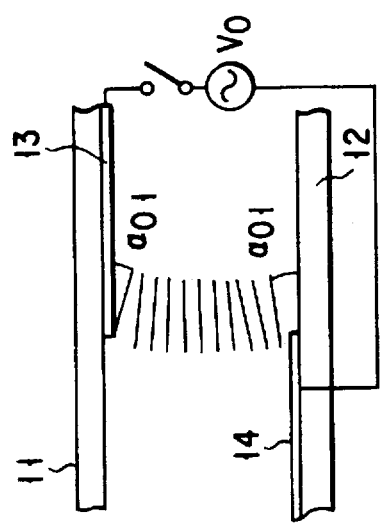
Figure 3C:
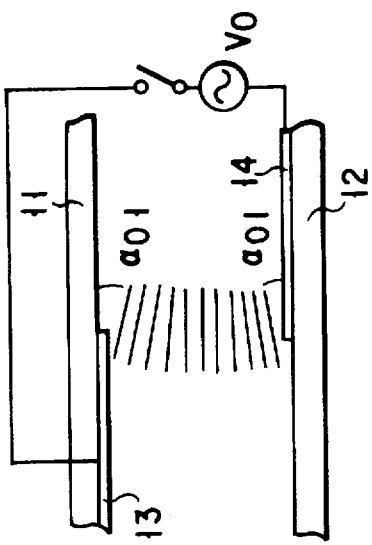
Figure 3D:
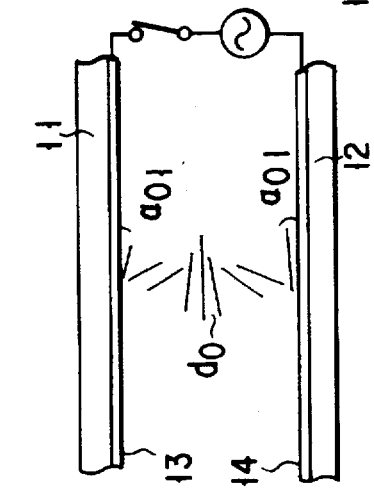
Figure 3E:
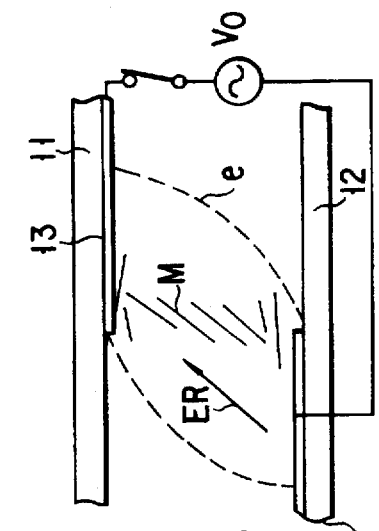
Figure 3F:
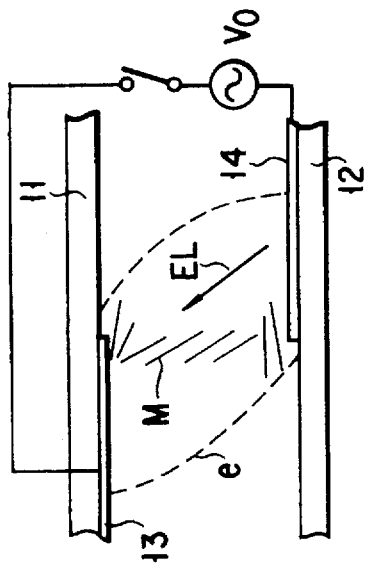

FIGS. 3A to 3F show influences to the molecular alignment when the liquid crystal molecules on the surfaces of the upper and lower substrates 11 and 12 have the same alignment direction and the same pretilt angle $α_0$, the liquid crystal molecules are not twisted, and the upper and lower electrode shapes are different from each other. FIGS. 3A to 3C show a voltage non-application state, and FIGS. 3D to 3F show a voltage application state. FIGS. 3A and 3D show a state wherein the upper and lower substrates have the same electrode shape, and an electric field is applied only in the direction of thickness of the liquid crystal layer.

The liquid crystal molecules have a position $d_0$ of molecules parallel to the substrate at the middle point of the thickness d of the liquid crystal layer. Even when a voltage $V_0$ is applied from a power supply to the electrodes 13 and 14, the position $d_0$ does not change, as shown in FIG. 3D. In FIG. 3B, the electrode 14 of the lower substrate 12 is formed at the left half portion while the right half portion is a non-electrode region. The electrode 13 of the upper substrate 11 is formed at the right half portion while the left half portion is a non-electrode region. The two electrodes 13 and 14 oppose the non-electrode regions.

When the voltage $V_0$ is applied, an electric field having a transverse field component is applied to the liquid crystal layer because of the shift between the electrodes. As shown in FIG. 3E, the molecules M have a molecular alignment steeply rising toward the upper right side.

FIG. 3C shows an electrode structure in which the electrode 14 of the lower substrate 12 is formed at the right half portion while the left half portion is a non-electrode region, and the electrode 13 of the upper substrate 11 is formed at the left half portion while the right half portion is a non-electrode region. The electrodes 13 and 14 oppose the non-electrode regions. As shown in FIG. 3F, when the voltage $V_0$ is applied, an electric field having a transverse field component is applied to the liquid crystal layer, and lines of electric force e having a component indicated by an arrow $E_L$ rising toward the upper left side are generated. For this reason, the liquid crystal molecules M have an alignment steeply rising toward the upper left side. That is, the liquid crystal molecular alignment in a voltage application state depends on formation of an oblique field having a transverse field component.

In such a molecular alignment, the molecules are tilted in two directions depending on the way of voltage application, as shown in FIGS. 3A to 3F. This is because the liquid crystal molecules at the upper half portion of the liquid crystal layer and those at the lower half portion are symmetrically aligned in a voltage non-application state. That is, the number of tilt directions of the liquid crystal molecules is two or more as a degree of freedom.

As shown in FIG. 2A, the upper electrode 13 has an electrode pattern in which the plurality of striped conductive portions 13a are arranged at an equal interval through the non-conductive portions 13b, and the lower electrode 14 has an electrode pattern in which the plurality of striped conductive portions 14a are arranged at an equal interval through the non-conductive portions 14b. When these electrodes oppose each other, the substrates overlap and form a gap therebetween such that the conductive portions 13a or 14a of one of the electrodes oppose the non-conductive portions 14b or 13b of the other electrode. In this case, rubbing is performed such that the upper and lower substrates have the same liquid crystal aligning direction.

As a result, the liquid crystal regularly holds the splay alignment state in the voltage non-application state. However, in the voltage application state, since the conductive portions of the upper and lower electrodes are shifted from each other, an oblique field having a transverse field component is formed between the electrodes, thereby forming the lines of electric force e whose gradient direction alternately changes, as shown in FIG. 2B. The liquid crystal molecules M rise and are aligned along the lines of electric force. Therefore, the liquid crystal alignment becomes discontinuous at the boundary between the electric field rising toward the upper right side and the electric field rising toward the upper left side, and a wall line (to be referred to as a "wall" for discrimination from disclination exhibiting memory properties in a general sense, which occurs upon application of an electric field) is formed at the boundary (DL in FIG. 2B) in the tilt direction of the molecules.

As shown in FIG. 2B, when a voltage is applied, a wall line can be formed at the boundary (DL) in the tilt direction of molecules, and a function of scattering incident light can be obtained. To ensure the degree of freedom of two or more tilt directions of liquid crystal molecules, in addition to the molecular alignment shown in FIG. 2B, the same effect as described above can be obtained by using a nematic liquid crystal composition having a negative dielectric anisotropy as a liquid crystal composition, and aligning liquid crystal molecules in a perfect vertical alignment in which the pretilt angle in the upper and lower substrates is 90°. In this case, the number of tilt-down directions of the liquid crystal molecules is two or more as a degree of freedom.

That is, when the liquid crystal molecular alignment is set such that the liquid crystal molecules are effectively uniformly aligned in a voltage non-application state, and the number of tilt-up or tilt-down directions of liquid crystal molecules is two or more as a degree of freedom, and the electrode is formed such that an oblique field is applied in two different directions in units of small regions, an excellent display performance for solving the above problem can be obtained.

More specifically, as a molecular alignment for ensuring two of more tilt-down directions as a degree of freedom, a splay alignment, a splay twisted alignment, a vertical alignment, or the like can be used.

The electrodes must have a structure in which conductive portions and non-conductive portions are formed in small regions of the electrodes, the conductive portions of one of the electrodes opposing each other through the liquid crystal layer are arranged to oppose the non-conductive portions of the other electrode between the substrates, and a lot of portions for largely changing the tilt direction of the molecules are formed.

When a lot of above electrode structures are formed in one pixel, the rise direction of liquid crystal molecules is finely divided. Therefore, a lot of wall lines can be formed in one pixel, and light scattering can be caused at these portions.

The LCD based on this principle need no medium except for a liquid crystal as a means for scattering light. In addition, the LCD can be realized without forming any discontinuous liquid crystal molecular alignment because the liquid crystal molecular alignment in the light transmission state does not much differ from that in the light scattering state. For this reason, a very satisfactory light scattering state can be obtained at a low applied voltage without generating a hysteresis. The LCD can be manufactured in a simple manufacturing process. An oblique field is formed in two or more directions. The liquid crystal molecules are tilted up or down in accordance with the oblique field in these directions to form a wall-like molecular alignment at the boundary between the two or more electric fields, thereby forming a periodical index profile. Since the periodical index profile is formed by the liquid crystal molecules, a sufficient scattering state can be obtained by the refractive effect and the diffraction grating effect. When non-polarized light is to be scattered, periodical index profiles must be formed in two or more directions. The index profiles formed in the respective directions preferably have the same period and intensity.

Formation of such a periodical index profile largely depends on the angle and strength of the oblique field. More specifically, when the angle of the oblique field is small, only the field component in the normal direction becomes too strong. An electric field close to a normal field is applied to the non-conductive portions of the electrode, and the liquid crystal molecules of the non-conductive portions change as those of the conductive portions. The refractive index becomes uniform in the cell plane, so no periodical index profile is formed. When the angle of the oblique field is large, the field component consists of only a transverse component. No electric field is applied in the direction of thickness of the liquid crystal layer of the non-conductive portions, so the liquid crystal molecules hardly change. Therefore, to form a periodical index profile and obtain a more excellent scattering state, it is important to appropriately set the angle of the oblique field.

The light scattering effect of a diffraction grating depends on $\Delta n$d and is represented as follows:

$$T \sim \cos^2(\Delta Nd \cdot \pi/\lambda)$$

where T is the scattering intensity (intensity with respect to incident light), $\Delta N$ is the difference between the maximum value and the minimum value in the index profile, d is the thickness of the liquid crystal layer, and $\lambda$ is the wavelength of incident light. As is apparent from this relation, the light scattering effect of a diffraction grating depends on the value $\Delta Nd$ and has an extreme value with respect to the value $\Delta Nd$. Therefore, when the value $\Delta Nd$ is very large, an extreme value is generated in electrooptic characteristics of the liquid crystal cell. This makes it difficult to perform gradation expression using an analog signal. In addition, when the value $\Delta Nd$ is very small, no sufficient scattering effect can be obtained.

Figure 13:
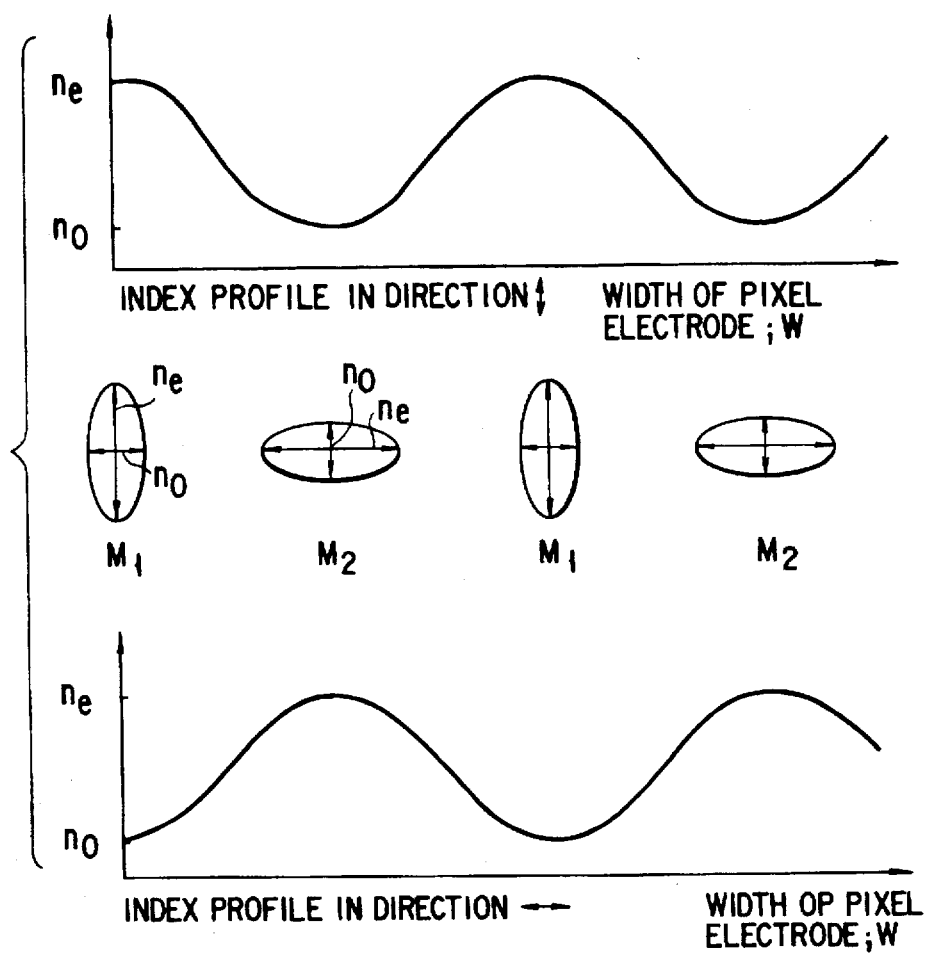
FIG. 13 show graphs showing an ideal liquid crystal molecular alignment.

As a result of various experiments about liquid crystal molecular alignments for easily obtaining the light scattering effect, the present inventors have confirmed that a liquid crystal molecular alignment shown in FIG. 13 is an ideal alignment for obtaining a high scattering effect.

In the alignment shown in FIG. 13, liquid crystal molecules are alternately rotated through 90° and liquid crystal molecules $M_1$ and $M_2$ continuously change. In this alignment, index profiles are formed in two directions. The index profiles in the two directions have the same shape shifted by a ½ period. When the liquid crystal molecules are aligned to have index profiles at the same period in two directions, a high scattering effect can be obtained by the refractive effect and the diffraction grating effect.

The present invention is to obtain an LCD with a higher scattering effect by aligning liquid crystal molecules as shown in FIG. 13 using an oblique field. An appropriate value of the angle of the oblique field or the value ΔNd was found to depend on the widths of the conductive portion and the non-conductive portion of the electrode, the thickness of the liquid crystal layer between the substrates, and the like, and an optimum range was found by extensive studies. This will be described below.

Figure 4:
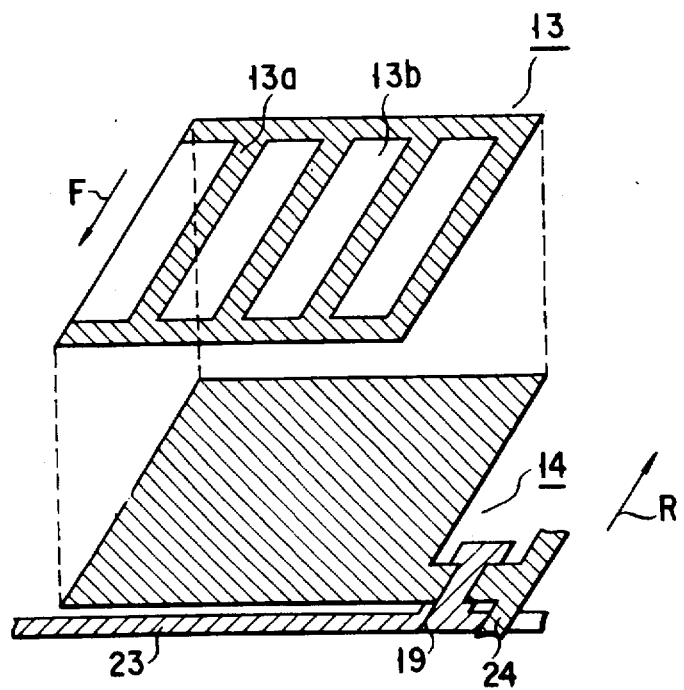
FIG. 4 is a perspective view showing the patterns of the upper and lower electrodes of an LCD according to the first embodiment of the present invention.

An LCD according to the first embodiment of the present invention has an electrode structure in units of pixels, in which a striped electrode is formed on one side and a continuous electrode is formed on the other side. An electrode structure is shown in FIG. 4 as a detailed example. Referring to FIG. 4 showing one pixel portion, the electrode 13 which forms a plurality of stripes consisting of the conductive portions 13a and the non-conductive portions 13b is arranged on the upper substrate in units of pixels. When the width of the conductive portion 13a is compared with that of the non-conductive portion 13b of the electrode 13, 13a<13b. The electrode 14 arranged on the lower substrate consists of a solid conductive portion.

Figure 5A:
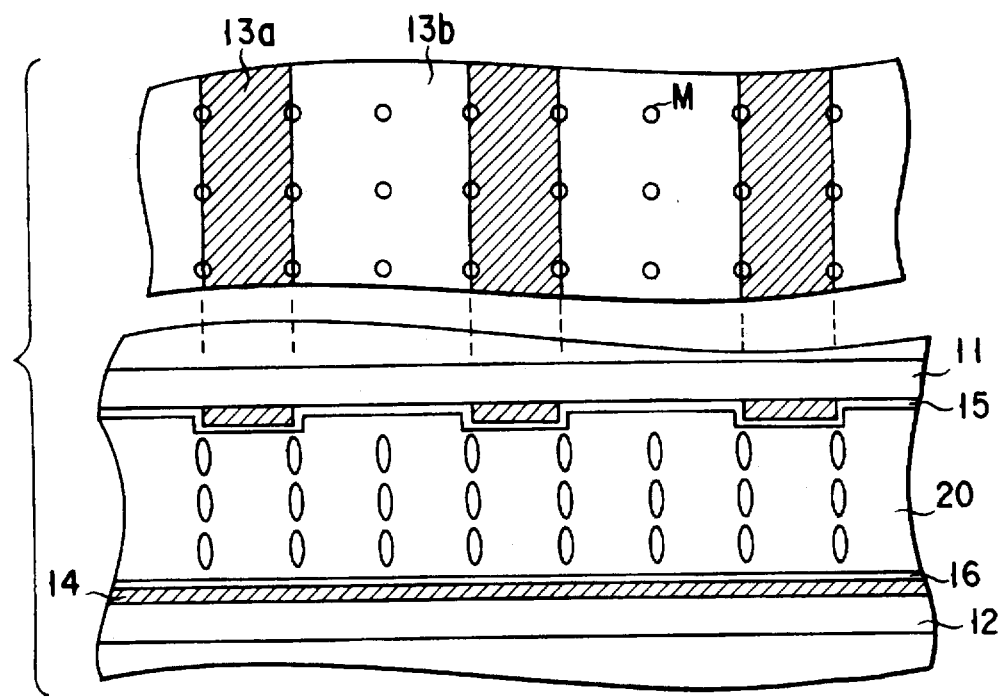
FIGS. 5A and 5B show plan and sectional views of the liquid crystal cell of the LCD according to the first embodiment of the present invention in voltage application and non-application states.
Figure 5B:
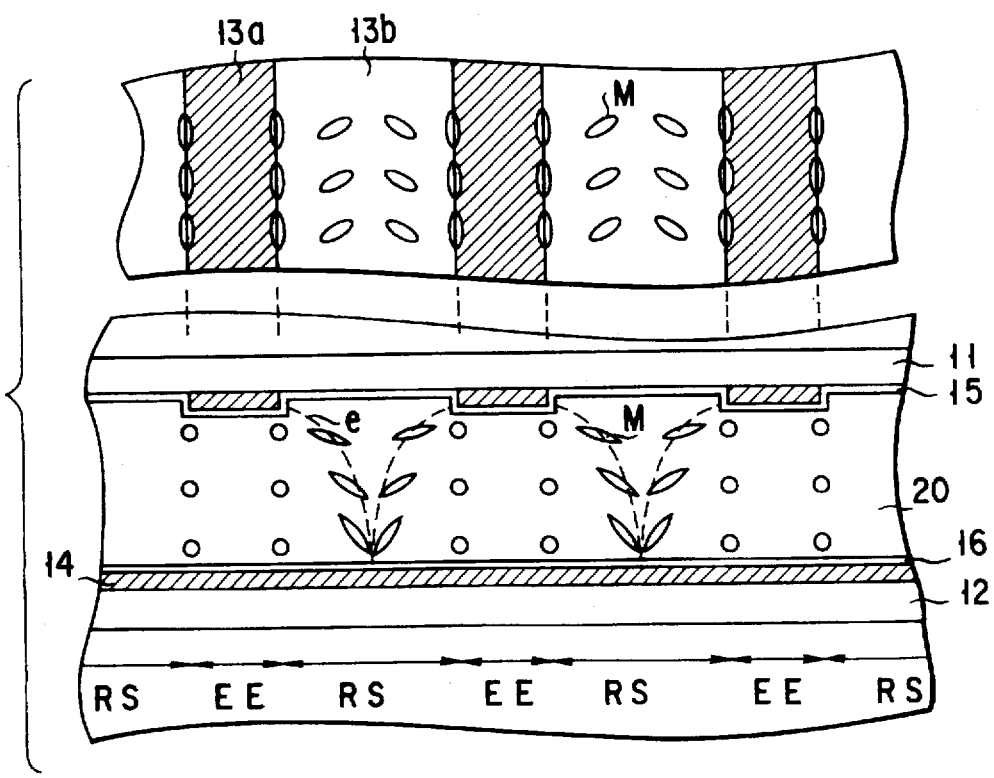
Figure 9A:
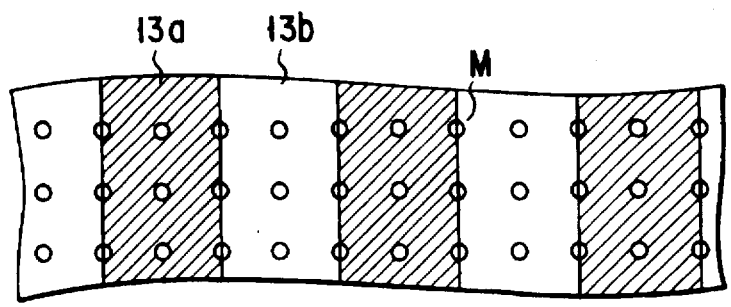
FIGS. 9A to 9C show plan and sectional views and a graph for explaining the relationship between the regions EE and RS in the voltage non-application state.
Figure 9B:
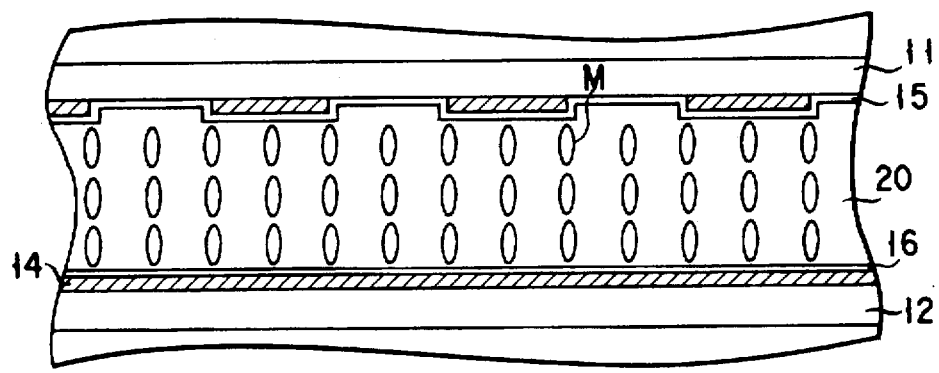
Figure 9C:
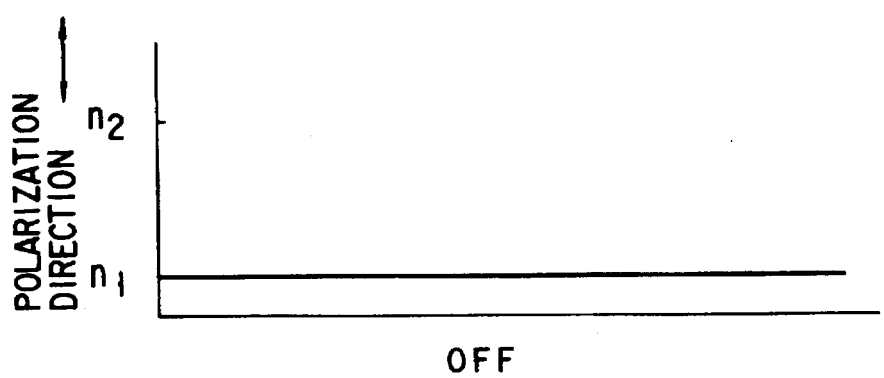

The conductive portions 13a are electrically connected to each other in one pixel. FIGS. 5A and 5B show the relationship between the electrode arrangement and the liquid crystal molecules. As for a sectional shape taken along the normal direction of the LCD, the electrodes have an arrangement in which regions EE where both the substrates have the conductive portions and regions RS where non-conductive portions are present are alternately arranged.

As for a sectional shape taken along the normal direction of the LCD, a combination as shown in FIG. 6 or 7 is also available, in which the regions EE and the regions RS are alternately arranged. With these electrode structures, the effect of the present invention can also be obtained. However, with the electrode structure as shown in FIG. 6 or 7, alignment becomes difficult. Therefore, the LCD according to the first embodiment of the present invention is characterized in that the electrode of one substrate consists of conductive portions and non-conductive portions in one pixel while the electrode of the other electrode consists of a continuous conductive portion.

With the electrode structure shown in FIGS. 4, 5A, and 5B, it was found as a result of experiments that better characteristics could be obtained by forming an electrode structure for satisfying a relation $\tan(\pi/9) \leq RS/2D \leq \tan(7\pi/18)$. When RS/2D is smaller than $\tan(\pi/9)$, only the field component in the normal direction of the LCD becomes too strong. An electric field close to the normal field of the LCD is applied to the non-conductive portions of the electrode. The liquid crystal molecules of the non-conductive portions change as those of the conductive portions. The refractive index becomes uniform in a cell plane, so no periodical index profile is formed.

On the other hand, it was confirmed by experiments that, when RS/2D exceeded $\tan(7\pi/18)$, the field component consisted of only a transverse component, and the liquid crystal molecules in the direction of thickness of the liquid crystal layer of the non-conductive portions hardly changed.

A periodical index profile is formed within a range of $\tan(\pi/6) \leq RS/2D \leq \tan(7\pi/18)$, preferably within a range of $\tan(\pi/6) \leq RS/2D \leq \tan(\pi/3)$, more preferably within a range of $\tan(\pi/4) \leq RS/2D \leq \tan(7\pi/18)$, and most preferably within a range of $\tan(\pi/4) \leq RS/2D \leq \tan(\pi/3)$, and a high scattering effect can be obtained by the refractive lens effect and the diffraction grating effect. By using these portions, a desired index profile can be easily realized.

For example, with a structure as shown in FIGS. 8A and 8B, when portions where the molecule alignment does not change are formed in one pixel, a periodical index profile can be realized. Within a range of $RS/2D > \tan(7\pi/18)$, no minimum necessary oblique field is obtained, and the refractive lens effect and the diffraction grating effect as the characteristic features of the present invention are degraded. Therefore, the high scattering effect is hardly obtained.

As for the width EE of the conductive portion, the following facts were confirmed by experiments. For example, when the width EE was larger than 3D, a strong electric field was applied to the non-conductive portions along the normal direction. An electric field close to the normal field was applied. The liquid crystal molecules of the non-conductive portions had the same molecular alignment as that of the liquid crystal molecules of the conductive portions. The refractive index became uniform in the cell plane, and no periodical index profile was formed. When the width EE was smaller than D/2, a sufficient oblique field for changing the liquid crystal molecular alignment was not applied.

When the liquid crystal composition has a negative dielectric anisotropy, the width EE of the conductive portion and the width RS of the non-conductive portion satisfy a relation $RS/3 \leq EE \leq 0.1 \times RS$. When the composition has a positive dielectric anisotropy, a relation $0 \leq EE \leq RS$ is satisfied. The reason for this will be described below with reference to FIGS. 9A to 9C and 10A to 10C.

The diffraction grating effect occurs when refractive indices $n_1$ and $n_2$ are alternately arranged. The ratio of $n_1:n_2$ for maximizing the scattering state by the diffraction grating effect is 1:1, as is known (M. Born and E. Wolf, Principles of Optics II, Tokai Daigaku Shuppankai (1975), p. 637). Therefore, to increase the diffraction grating effect, the width of a portion with a large refractive index and that of a portion with a small refractive index must be two-dimensionally almost equal to each other.

Figure 10A:
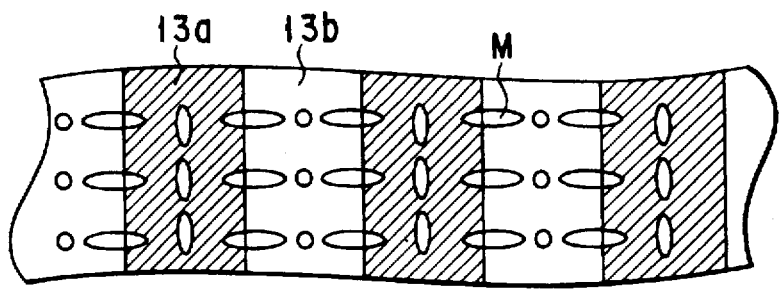
FIGS. 10A to 10C show plan and sectional views and a graph for explaining the relationship between the regions EE and RS in the voltage application state.
Figure 10B:
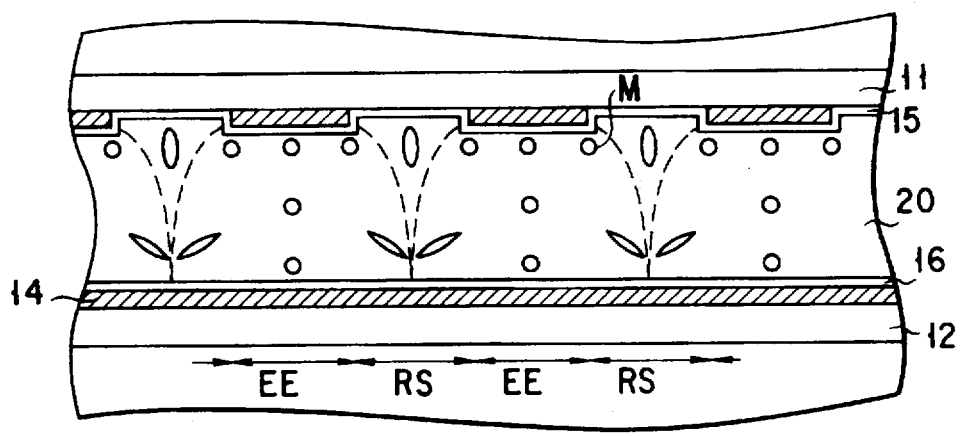

When a liquid crystal material having a negative dielectric anisotropy is sandwiched in the electrode structure of the LCD according to the first embodiment of the present invention, in which one electrode consists of a solid conductive portion, and the other electrode has conductive portions and non-conductive portions, the refractive index has the uniform value $n_1$ in a voltage non-application state. Upon application of a voltage, however, a normal field is applied to the portions EE, and an oblique field is applied to the portions RS, as shown in FIG. 10B. In addition, the liquid crystal molecules in the portions EE are uniformly tilted down by the normal field. Therefore, the refractive index in the direction of the striped electrode has the uniform value $n_2$.

Figure 10C:
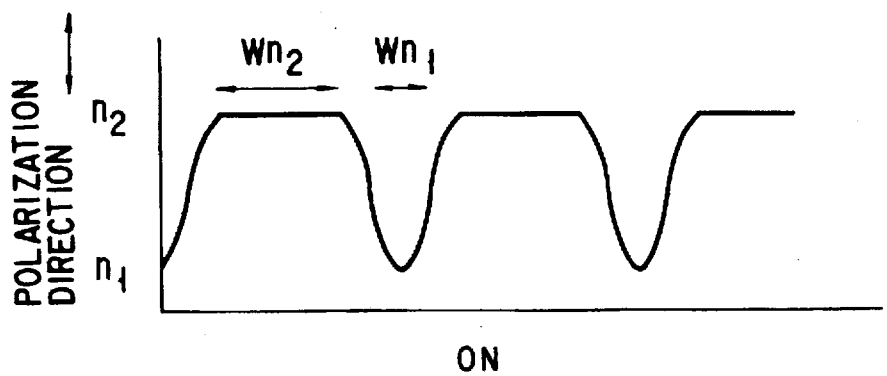

On the other hand, the liquid crystal molecules in the portions RS are tilted down in the direction of the oblique field, and a continuously changing index profile is obtained. An index profile shown in FIG. 10C is obtained for the component in the direction of the striped electrode. Therefore, a width $Wn_2$ for obtaining the refractive index $n_2$ in a state $V_{on}$ is equal to the width EE although a width $Wn_1$ for obtaining the refractive index $n_1$ is smaller than the width RS.

The portions EE have a uniform refractive index while the portions RS have a continuously changing refractive index. For this reason, when the width of the portion EE is equal to that of the portion RS, $Wn_1 < Wn_2$ in the two-dimensional index profile. To obtain the ratio of $Wn_1:Wn_2=1:1$, the width of the portion EE must be smaller than that of the portion RS. The condition $Wn_1:Wn_2=1:1$ is a necessary and sufficient condition for obtaining an optimum structure, and at the same time, a range for obtaining a practical effect. More specifically, when the width of the portion EE is smaller than that of the portion RS, the condition $Wn_1:Wn_2=1:1$ can be realized by adjusting the strength and angle of the oblique field.

The portion EE having a width larger than that of the portion RS due to manufacturing margins or the like does not always result in the absence of diffraction grating effect. As a result of experiments, it was found that a width up to 1.1 times that of the region RS posed no practical problem. However, when the width becomes much larger than the portion RS, a range where no electric field is applied is formed. Even if the oblique field is adjusted, the portion RS cannot have the refractive index $n_2$. Therefore, the diffraction grating effect cannot be obtained because $Wn_1>Wn_2$. As a result of experiments, the lower limit value for obtaining the diffraction grating effect was $RS/3 \leq EE$.

The index profile for a polarized light component in the direction of the striped electrode has been described above. The index profile for a polarized light component in a direction perpendicular to the direction of the striped electrode is reversed.

When a liquid crystal composition having a positive dielectric anisotropy is used, a normal field is applied to the portions EE. The refractive index is $n_1$ for any polarized light component, so the period of index profile of a polarized light component is not equalized with that of a perpendicular component. Therefore, the width of the portion EE is preferably as small as possible. In a liquid crystal composition with a positive dielectric anisotropy, the diffraction grating effect and the refractive lens effect do not depend on the ratio of RS: BE as far as $0 \leq EE \leq RS$.

The width EE is set within the above range in accordance with the dielectric anisotropy of the liquid crystal composition. With this arrangement, an optimum oblique field can be applied to obtain a satisfactory diffraction grating effect.

When values satisfying the above relations are set, a sufficient oblique field is applied to the LCD according to the first embodiment of the present invention. The behavior of liquid crystal molecules in the LCD having the above electrode structure will be described with reference to FIGS. 5A and 5B.

FIGS. 5A and 5B are plan and sectional views showing the behavior of liquid crystal molecules in a voltage non-application state and in a voltage application state, respectively. Alignment treatment of the upper aligning film 15 and the lower aligning film 16 is vertical aligning treatment in which rubbing of the upper and lower substrate surfaces is performed in a direction parallel to the electrodes, and the aligned states are shifted by 180° (FIG. 4). As a result, the liquid crystal molecules M of the liquid crystal layer 20 have a homeotropic alignment.

When a voltage is applied to the upper electrode 13 and the lower electrode 14, the oblique field e as shown in FIG. 5B is formed. The liquid crystal molecules M are tilted down by the normal component of the oblique field. Simultaneously, an electric field corresponding to the transverse component of the oblique field is applied in the direction of thickness of the liquid crystal layer, resulting in the twist phenomenon of the liquid crystal molecules in the planar direction of the liquid crystal layer. More specifically, the liquid crystal molecules are tilted down while being twisted, thereby forming a molecular alignment inclined with respect to the stripe direction. In the portion EE where both the substrates have conductive portions, the liquid crystal molecules M are only tilted down because of the normal field, though the twist phenomenon does not occur. Therefore, a liquid crystal molecular alignment as shown in FIG. 5B is obtained.

The liquid crystal molecular alignment shown in FIG. 5B is close to the ideal molecular alignment shown in FIG. 13. It was confirmed by experiments that a high scattering effect could be obtained.

An LCD according to the second embodiment of the present invention will be described below.

The LCD according to the second embodiment of the present invention has an electrode structure consisting of conductive portions and non-conductive portions in units of pixels. An electrode structure is shown in FIG. 11 as a detailed example. FIG. 11 shows one pixel portion. The electrode structure has electrodes 13 and 14 which form a plurality of stripes on upper and lower substrates, respectively, in units of pixels. When conductive portions 13a and 14a and non-conductive portions 13b and 14b of the respective electrodes are compared with each other, 13a<13b, and 14a <14b. The conductive portion 13a or 14a is arranged at the center of the non-conductive portion 13b or 14b. The conductive portions 13a or 14b are electrically connected in one pixel.

Figure 12A:
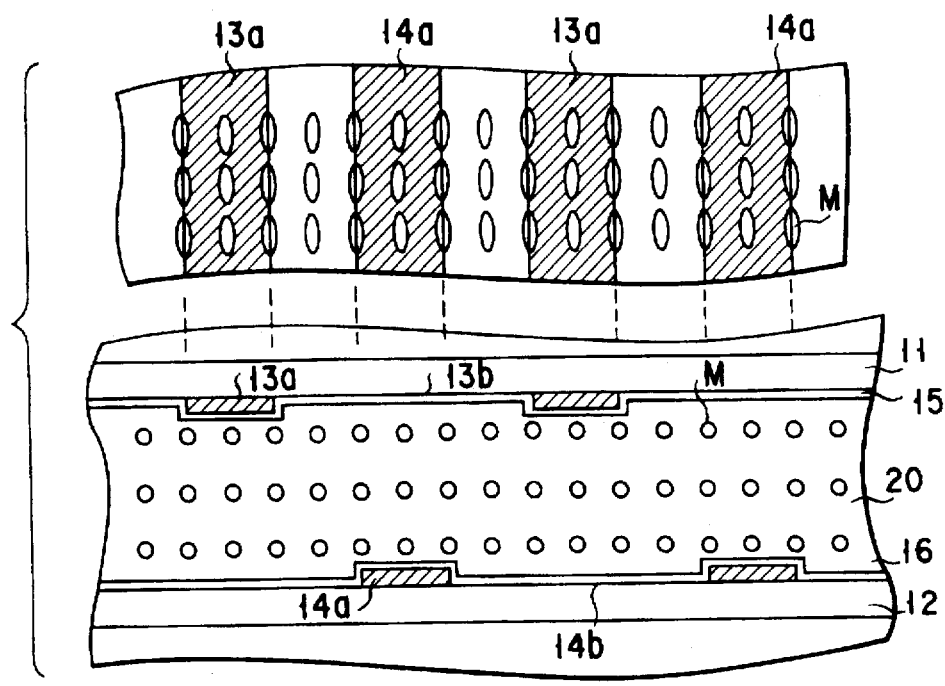
FIGS. 12A and 12B show plan and sectional views of the liquid crystal cell of the LCD according to the second embodiment of the present invention in voltage application and non-application states.
Figure 12B:
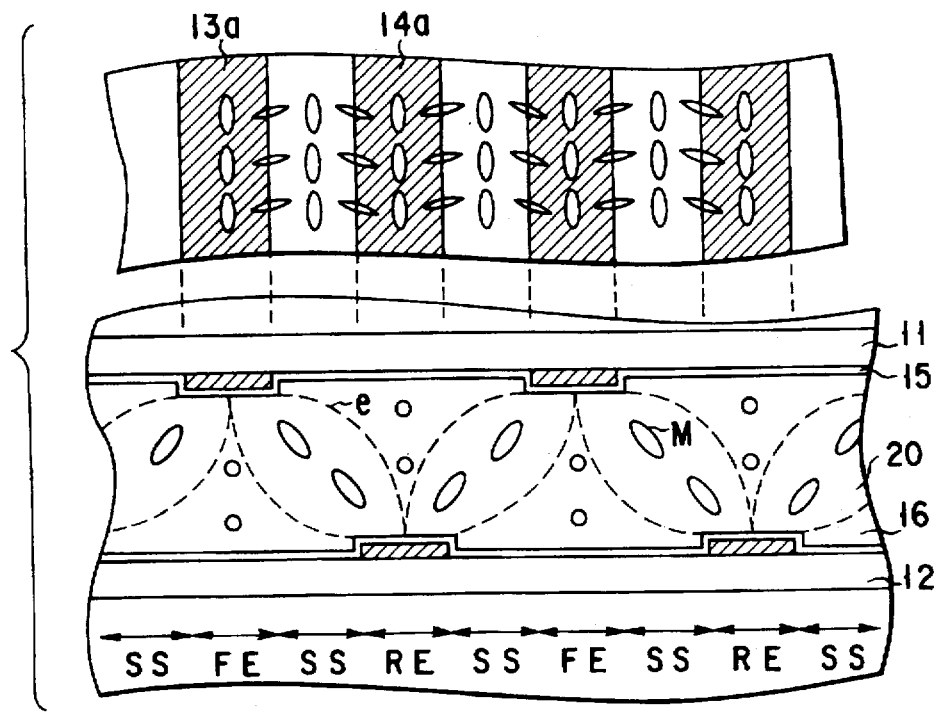

FIGS. 12A and 12B are views showing the relation between the electrode arrangement and liquid crystal molecules. As for the sectional shape taken along the normal direction of the LCD, the electrode has a structure in which widths RE where only one of the substrates with electrode has a conductive portion and widths FE where only the other substrate with electrode has a conductive portion are alternately arranged through widths SS where both the substrates have non-conductive portions.

With such an electrode structure, it was found as a result of experiments that better characteristics could be obtained by satisfying a relation $\tan(\pi/9) \leq SS/D \leq \tan 7\pi/18)$. When SS/D was smaller than $\tan(\pi/9)$, only the field component in the normal direction became too strong. An electric field close to a normal field was applied to the non-conductive portions of the electrodes. The liquid crystal molecules of the non-conductive portions changed as those of the conductive portions, so no periodical index profile was formed. When SS/D exceeds $\tan(7\pi/18)$, the field component consisted of only the transverse component. It was confirmed by experiments that the liquid crystal molecules hardly changed in the direction of thickness of the liquid crystal layer of the non-conductive portion.

A periodical index profile is formed within a range of $\tan(\pi/6) \leq SS/D \leq \tan(7\pi/18)$, preferably within a range of $\tan(\pi/6) \leq SS/D \leq \tan(\pi/3)$, more preferably within a range of $\tan(\pi/4) \leq SS/D \leq \tan(7\pi/18)$, and most preferably within a range of $\tan(\pi/4) \leq SS/D \leq \tan(\pi/3)$, and a high scattering effect can be obtained by the refractive lens effect and the diffraction grating effect.

The reason why the portions SS where both the substrates have non-conductive portions are always inserted between the portions RE and FE is that an electric field in the transverse direction can always be easily formed. When the width of the portion SS becomes too large, the field strength decreases to impede the change of liquid crystal molecules. Therefore, the width of the portion SS is set within the above range. In the plane of pixel, the portions SS preferably have the same width. However, variations may occur in widths of the portions SS because of margins for manufacturing LCDs. In such a case, the adjacent conductive portions FE in one pixel preferably are not electrically connected to each other, and different potentials be set. With this electrode structure, a potential difference according to the deviation in widths of the portions SS can be generated, and variations in field strength can be suppressed.

In the LCD according to the second embodiment of the present invention, when the width of the conductive portion of the upper substrate is D/2 to 3D, excellent characteristics can be obtained. When the width FE or RE exceeds 3D, a strong electric field is applied to the non-conductive portion in the normal direction. An electric field close to the normal field is applied to form the similar molecular alignment as that of the liquid crystal molecules of the conductive portion, so no wall is formed. It was confirmed by experiments that, when the width FE or RE was smaller than D/2, no sufficient oblique field for changing the liquid crystal molecular alignment was applied.

When values satisfying the above relations are set, a sufficient oblique field is applied to the LCD according to the second embodiment of the present invention. The behavior of liquid crystal molecules in the LCD having such an electrode structure will be described with reference to FIGS. 12A and 12B.

FIGS. 12A and 12B are plan and sectional views showing the behavior of liquid crystal molecules in a voltage non-application state and in a voltage application state, respectively. Alignment of an upper aligning film 15 is shifted from that of a lower aligning film 16 by 180°, and liquid crystal molecules M of a liquid crystal layer 20 have a uniform alignment (FIG. 11).

When a voltage is applied to the upper and lower electrodes 13 and 14, the oblique field e as shown in FIG. 12B is formed. The liquid crystal molecules are tilted up by the normal component of the oblique field. Simultaneously, an electric field corresponding to the transverse component of the oblique field is applied in the planar direction of the liquid crystal layer, resulting in a twist phenomenon of the liquid crystal molecules in the direction of plane of the liquid crystal layer. The liquid crystal molecules are initially aligned parallel to the electrode and perpendicular to the oblique field. Therefore, clockwise and counterclockwise twists can be obtained. Tilt up×(clockwise twist or counterclockwise twist) results in two opposing tilt-up directions. The degree of freedom of tilt direction is two. More specifically, the liquid crystal molecules are tilted up while being twisted, thereby forming a molecular alignment inclined with respect to the stripe direction. In addition, the conductive portions 13a and 14a oppose the central portions of the non-conductive portions and are hardly influenced by the oblique field. For this reason, liquid crystal molecules of these portions do not change. Therefore, a liquid crystal molecular alignment as shown in FIG. 12B is obtained.

The liquid crystal molecular alignment shown in FIG. 12B is close to the ideal molecular alignment shown in FIG. 13. Since index profiles having almost the same period and intensity are formed in two polarization directions, a high scattering effect can be obtained for non-polarized light.

As described above, in the LCD of the present invention, index profiles having almost the same period and intensity are formed in two polarization directions in a more ideal molecular alignment. For this reason, the scattering effect of non-polarized light can be further increased as compared to the conventional LCD. The diffraction grating effect occurs when refractive indices $n_1$ and $n_2$ are alternately arranged, as described above. The ratio of $n_1:n_2$ for maximizing the scattering state by the diffraction grating effect is 1:1, as is known. The present inventors confirmed by various experiments that an electrode structure for easily obtaining the ratio of $n_1:n_2=1:1$ could be formed by equalizing the width of the portion RE or FE with that of the portion SS, and checked an allowance of the width of the portion RE or FE by experiments. As a result, it was confirmed that, when the width of the portion RE or FE was smaller than 0.9 times that of the portion SS or larger than 1.1 times that of the portion SS, the ratio of $n_1:n_2=1:1$ could hardly be obtained. Therefore, the width of the portion RE or FE is preferably set within a range of $0.9 \times SS \leq RE \leq 1.1 \times SS$ or $0.9 \times SS \leq FE \leq 1.1 \times SS$.

However, the strength of the oblique field also changes in accordance with other parameters including the interelectrode distance. In such a case, the ratio of $n_1:n_2=1:1$ is preferably obtained by optimally setting these parameters.

As for the period of the index profile in the LCD of the present invention, index profiles having the same period in some regions suffice. Even when index profiles with different periods are present in one pixel, the diffraction grating effect and the refractive lens effect can be obtained.

A liquid crystal molecular alignment will be described below.

The present invention is characterized in that liquid crystal molecules are aligned as shown in FIG. 13 by using an oblique field to obtain an LCD which realizes a higher scattering effect.

In the LCD of the present invention, the liquid crystal molecules are tilted down or up while being twisted by an oblique field. In addition to the uniform or homeotropic alignment, the same effect as described above can also be obtained with a molecular alignment such as a splay alignment in which the liquid crystal molecules are uniform in a voltage non-application state, and the twist phenomenon and tilt-up or tilt-down simultaneously occur upon application of a voltage.

The molecular alignment of the present invention ideally has the degree of freedom of two. It is more preferable to use the uniform or homeotropic alignment.

In the uniform alignment, the electrode structure preferably has a combination of two substrates each having an electrode consisting of conductive portions and non-conductive portions. In the homeotropic alignment, the electrode structure preferably has a combination of a substrate having an electrode consisting of a solid conductive portion and a substrate having an electrode consisting of conductive portions and non-conductive portions. In the uniform alignment, when a substrate having an electrode consisting of a solid conductive portion and a substrate having an electrode consisting of conductive portions and non-conductive portions are combined, the refractive index of the conductive portion becomes $n_1$ in all directions. For this reason, although the scattering effect can be obtained in each polarization direction, the scattering effect is degraded as compared to the LCD shown in FIGS. 5A and 5B because the index profiles differ in the respective directions. This can also be applied when two substrates each having an electrode consisting of conductive portions and non-conductive portions are combined in the homeotropic alignment.

Therefore, when the liquid crystal molecular alignment is the uniform alignment, the electrode structure shown in FIG. 8 is preferably employed. In the homeotropic alignment, the electrode structure shown in FIG. 4 is preferably employed.

As described above, the light scattering effect of a diffraction grating depends on the value $\Delta Nd$. The value $\Delta N$ is the difference between the maximum value and the minimum value in the index profile, which depends on the index anisotropy $\Delta\Delta(=n_e-n_o)$ of a liquid crystal composition. In an ideal molecular alignment as shown in FIG. 13, the value $\Delta n$ is equal to the value ΔN, i.e., $n_2=n_e$, and $n_1=-n_o$. However, in the LCD of the present invention, the liquid crystal molecules are tilted up or down while being twisted, so the value ΔN tends to be smaller than the value Δn. For this reason, the value Δn of the liquid crystal composition must be set larger than an arbitrary value ΔN.

The rectilinear propagation ratio of the LCD of the present invention is represented by the above relation $T=\cos^2(\Delta N d \cdot \pi/\lambda)$. When $\Delta N d/\lambda = \frac{1}{2}$, the rectilinear propagation ratio becomes zero to maximize the diffraction grating effect. By experiments in which the value Δnd was variously changed, and the electrooptic characteristics were measured, it was confirmed that the value Δnd for realizing $\Delta N d/\lambda = \frac{1}{2}$ had to be set within the following range.

When light consisting of a visible range of 400 to 700 nm is to be incident, the product of the index anisotropy Δd of the liquid crystal composition and the thickness d of the liquid crystal layer must be set within a range of 350 nm ≤ Δnd ≤ 1,050 nm. When the value Δnd is smaller than 350 nm, no sufficient scattering effect can be obtained. When the value Δnd is larger than 1,050 nm, the electrooptic characteristics have two or more extreme values. This was confirmed by experiments.

When monochromatic light having spectral characteristics and a bandwidth of 100 nm or less is to be incident, the value Δnd must be set within a range of $(\lambda-50)/2$ nm ≤ Δnd ≤ $2(\lambda+50)$ nm where λ is the center wavelength of the incident monochromatic light.

As in the range of the above visible region, when the value Δnd is very large, the electrooptic characteristics of the liquid crystal cell have a plurality of extreme values. When the value Δnd is smaller than the above range, the scattering effect decreases. The above fact was confirmed by experiments.

Figure 14A:
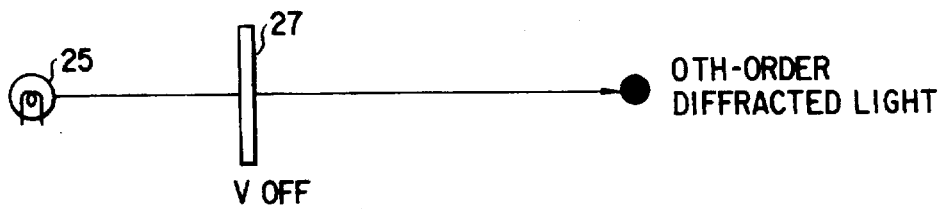
FIGS. 14A and 14B are views showing scattered images in the LCD of the present invention.
Figure 14B:
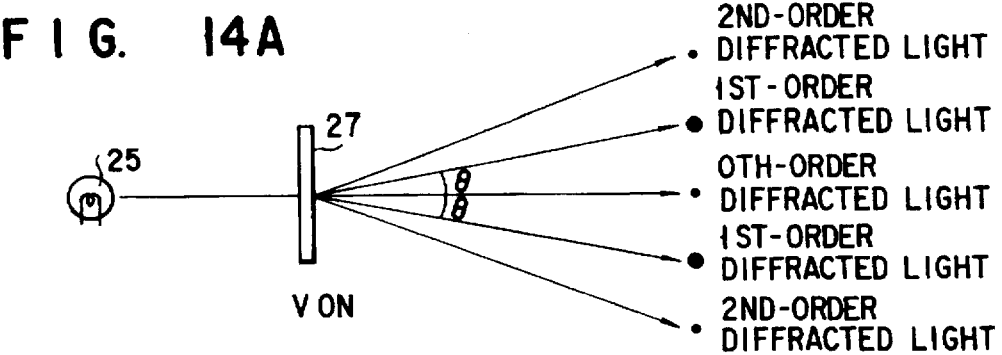

The scattered image in the LCD of the present invention uses the refractive effect and the diffraction grating effect. For this reason, the light is diffracted by a predetermined angle to form a spot scattered image. As for the spot scattered image of the LCD with the structure shown in FIG. 4, it can be confirmed, as shown in FIGS. 14A and 14B, a light beam from a light source 25 causes spot scattering on a straight line perpendicular to an LCD 27 having a striped electrode. FIG. 14A shows a voltage non-application state, and FIG. 14B shows a voltage application state.

An angle θ of 1st-order diffraction of the scattered image shown in FIG. 14B is represented as follows:

$$\sin \theta = \lambda/P$$

where P is the period of the index profile formed by liquid crystal molecules. In the LCD of the present invention, the angle θ of 1st-order diffraction must be 1 deg or more. At an angle smaller than 1 deg, the distance between the 0th-order diffracted light and each 1st-order diffracted light becomes too small, and the diffracted light beams overlap each other, so no sufficient scattering effect can be obtained. As the angle of 1st-order diffraction becomes larger, the scattering angle becomes larger accordingly. To increase the angle of diffraction, the period of the index profile must be decreased.

However, according to the present inventors, the period of the index profile was confirmed almost equal to the sum of the widths of the non-conductive portions and the conductive portions of the electrode. The widths of the non-conductive portion and the conductive portion have various limitations as described above, so the widths cannot be so decreased. The present inventors confirmed that the angle of 1st-order diffraction had to be 10 deg, i.e., the sum of the widths of the non-conductive portions and the conductive portions was limited to 2.5 μm (λ=440 nm). When the angle of 1st-order diffraction is 1 deg, the sum of the widths of the non-conductive portions and the conductive portions is 36 μm (λ=640 nm).

In the LCD according to the first embodiment of the present invention in which one substrate having an electrode consisting of conductive portions and non-conductive portions is arranged to oppose the other substrate having an electrode consisting of a solid conductive portion, the width must be set within a range of 2.5 μm (≤EE+RS≤36 μm.

In the LCD according to the second embodiment of the present invention in which two substrates each having an electrode consisting of conductive portions and non-conductive portions are combined, the width must be set within a range of 2.5 μm≤RE+SS≤36 μm and 2.5 μm≤FE+SS≤36 μm.

By setting these various conditions, the LCD of the present invention can obtain a high scattering effect for realizing a large scattering angle by the refractive lens effect and the diffraction grating effect. When the LCD of the present invention is manufactured at a twist angle of 0 deg and set between two polarizing plates perpendicular to each other such that each rubbing direction is parallel to the absorption axis of one of the polarizing plates, a transmissive-type display can be realized even by using a scattering light source. In this case, an optical mode using a birefringence effect is set, and the transmittance decreases. However, since the light transmission state is realized by the light scattering state of the liquid crystal layer, the dependency on viewing angle is decreased. Particularly, display inversion in gradation display can be prevented. Therefore, display characteristics better than those of the conventional TN-LCD can be obtained as a direct-vision display.

The LCD of the present invention has a function of scattering light. Therefore, the light source for irradiating the LCD preferably emits a parallel light beam having an angle perpendicular the LCD plane. More specifically, it was confirmed by experiments that, when a light beam having an angle smaller than 10 deg with respect to the normal direction of the LCD plane could be incident, the light source had no problem. A schlieren optical system can be used as a means for collimating a light beam.

Figure 15:
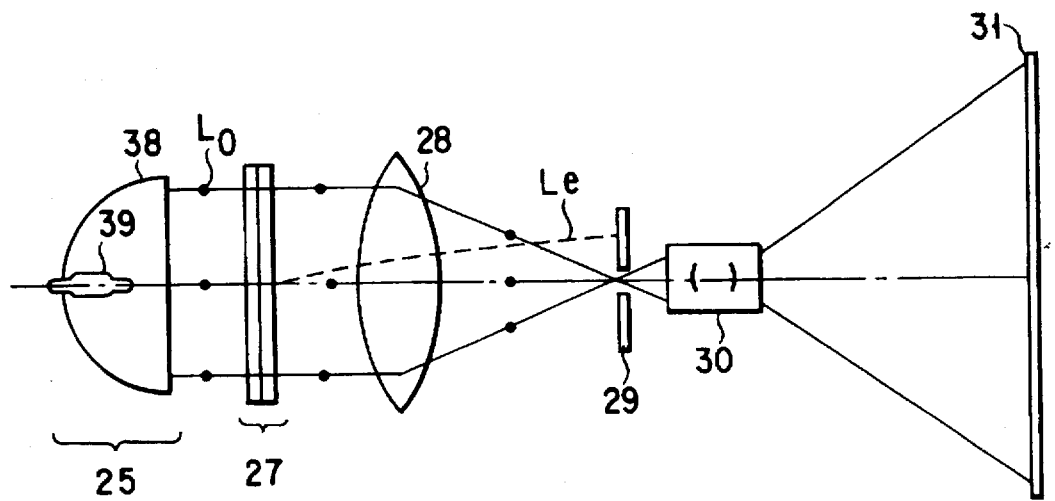
FIG. 15 is a diagram showing the arrangement of a schlieren optical apparatus.

FIG. 15 is a diagram showing the arrangement of a general schlieren optical apparatus. The schlieren optical apparatus comprises the parallel light source 25 consisting of a reflecting mirror 38 and a lamp 39, the LCD 27, a condenser lens 28, a stop 29 for removing an unnecessary light component, a projection lens 30 for enlarging and projecting a display image, and a screen 31.

The operation of the schlieren optical apparatus shown in FIG. 15 will be described below. An illumination light beam emitted from the light source as a parallel light beam is irradiated on the LCD 27. As the lamp 39, a discharge lamp (e.g., a metal halide lamp or a xenon lamp) or a halogen lamp is used together with the reflecting mirror 38. An image is displayed on the surface of the LCD 27. The light beam incident on the surface is transmitted or scattered in accordance with the density of the display image. A light beam $L_0$ emitted perpendicularly with respect to the display surface of the LCD 27 is condensed on the stop through the condenser lens 28, transmitted through the stop 29, and incident on the projection lens 30. A light beam $L_e$ scattered in the LCD 27 and transmitted through the condenser lens 28 is shielded by the stop 29, so this light beam cannot be incident on the projection lens 30. More specifically, the stop 29 selectively shields an unnecessary light component (scattered light) and selectively sends only a light beam perpendicularly exiting from the LCD 27 to the projection lens, thereby increasing the contrast. The light beam transmitted through the projection lens 30 is enlarged and formed into an image on the screen 31.

A projection-type liquid crystal display apparatus using the LCD according to the first or second embodiment of the present invention will be described with reference to FIGS. 16 and 17.

Figure 16:
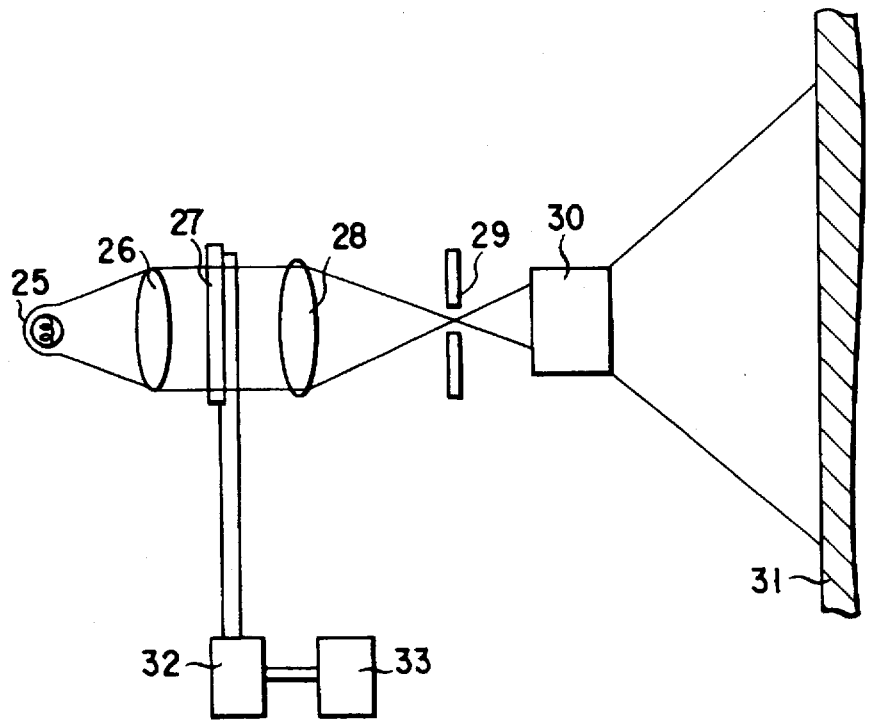
FIG. 16 is a diagram showing a projection-type liquid crystal display apparatus.

In the projection-type liquid crystal display apparatus shown in FIG. 16, a light beam from the light source 25 is almost collimated through a schlieren lens 26, transmitted through the LCD 27 of the present invention and the condenser lens 28, and projected on the screen 31 by the projection lens 30. To project only a rectilinear propagation component of the parallel light beam incident on the LCD, the stop 29 is arranged at the focal position of the condenser lens 28 to shield the light beam scattered by the LCD 27.

Figure 17:
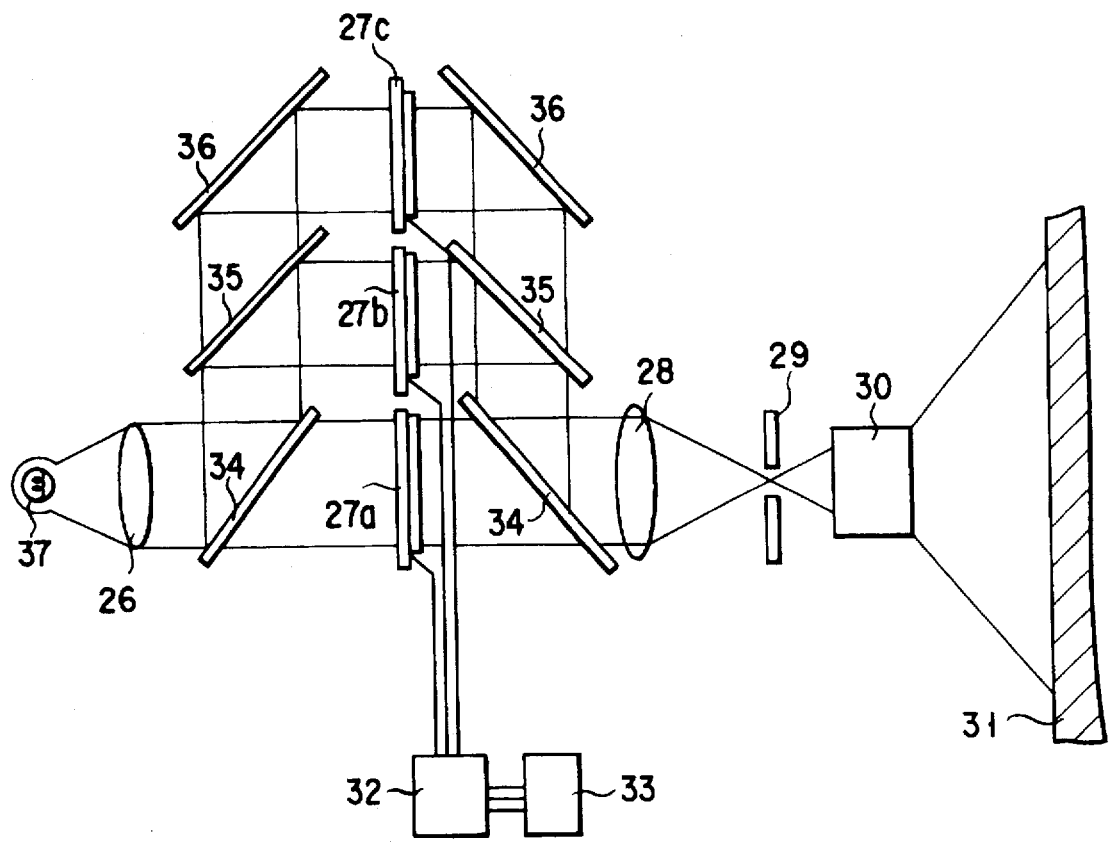
FIG. 17 is a diagram showing another projection-type liquid crystal display apparatus.

In the projection-type liquid crystal display apparatus shown in FIG. 17, two or more LCDs of the present invention are used, and a white light source 37 including three R, B, and G wavelengths, which has the same function as that of the light source used in FIG. 16, is used. A light beam from the light source is split into light components having arbitrary wavelengths. As a splitting means, a dichroic mirror or color filters can be used. The resultant light components are respectively incident on LCDs 27a to 27c. With this arrangement, the optical paths can be controlled in units of wavelengths. Therefore, color display can be realized.

When the LCD of the present invention is used for matrix display, the total transmittance may undesirably decrease in accordance with the area of pixels of modulation portions, i.e., the value of opening portions. Particularly, an LCD used for a projection-type liquid crystal display apparatus must simplify the element because of a structural requirement. In a simple matrix, the ratio of insulating regions becomes large. In a switching element, the ratio of a non-modulation portion including the switching element and a wiring region becomes large. To ensure a high contrast, it is preferable to shield these non-modulation portions. Therefore, these LCDs actually have a low transmittance.

Figure 18:
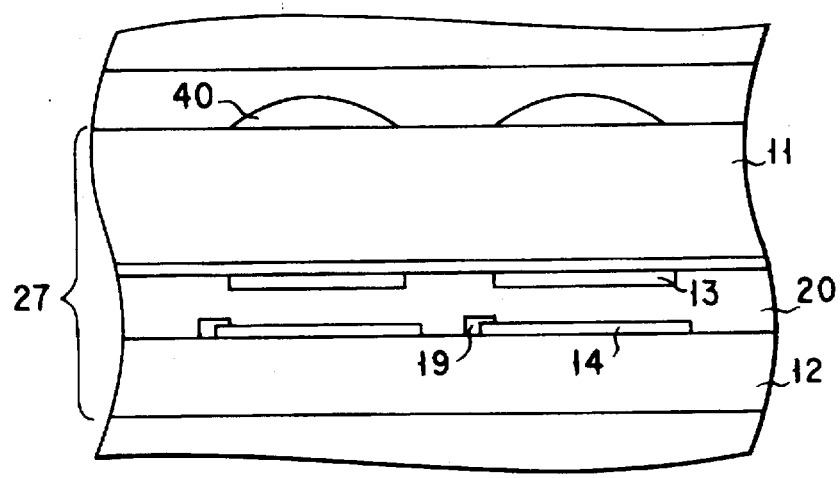
FIG. 18 is a sectional view of liquid crystal cells and microlenses.
Figure 19:
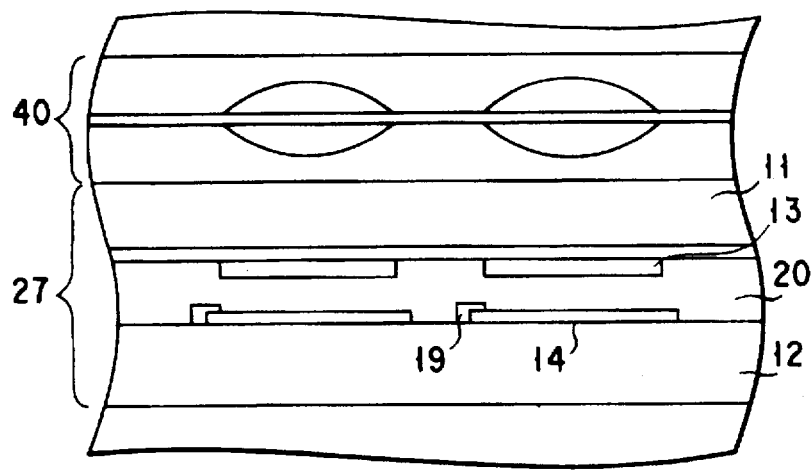
FIG. 19 is a sectional view of liquid crystal cells and microlenses which are different from those of FIG. 18.

This problem can be solved by arranging a layer having the same optical function as that of a convex lens in the light transmission path of the LCD. Examples are shown in FIGS. 18 and 19. Referring to FIG. 18, a layer 40 having the same optical function as that of a convex lens is formed between the substrates on the outer rear surface on the incident light side, thereby condensing a light beam propagating along the light-shielding layer to the modulation portion in the opening portion of the pixel. In the LCD of the present invention, the light beam incident on the liquid crystal layer and transmitted through the liquid crystal layer preferably propagates through an optical path parallel to the normal direction of the substrate. Therefore, as shown in FIG. 18, when the propagation direction of the light beam condensed to the opening portion is almost the same as the normal direction of the substrate, the transmittance can be increased, and at the same time, a high contrast can be maintained.

To obtain this function, the layer 40 having the same optical function as that of a convex or concave lens can be arranged between the electrode of the incident-light-side substrate of the LCD of the present invention and the layer having the same optical function as that of a convex lens, as shown in FIG. 19. The same optical function as that of a convex lens is controlled such that a light beam transmitted through the layer having the same optical function as that of a convex lens and the layer having the same optical function as that of a convex or concave lens has an angle with respect to the normal direction in the LCD plane, which angle is 0.9 to 1.1 times that of the incident light beam with respect to the normal direction in the LCD surface. With this arrangement, the parallelism of the light beam incident on the liquid crystal layer can be maintained. Therefore, the transmittance can be increased, and at the same time, a high contrast can be maintained.

Various examples of the present invention will be described below in detail with reference to the accompanying drawings.

EXAMPLE 1

The LCD according to the first embodiment of the present invention will be described with reference to FIGS. 4, 5A, and 5B.

FIG. 4 is a perspective view showing the patterns of the upper and lower electrodes of the LCD according to the first embodiment of the present invention. FIG. 5A shows plan and sectional views of a liquid crystal cell having opposing electrodes in a voltage non-application state. FIG. 5B shows plan and sectional views of the liquid crystal cell in a voltage application state.

A transparent stripe-like upper electrode 13 consisting of ITO (Indium Tin Oxide) was formed on one surface of an upper substrate 11 consisting of glass, and an upper aligning film (JALS-204-R14 available from Nippon Synthesis Rubber) 15 is formed on the resultant electrode surface. A transparent lower electrode 14 consisting of ITO was formed on one surface of the other lower substrate 12 consisting of glass, and a lower aligning film (JALS-204-R14 available from Nippon Synthesis Rubber) 16 is formed on the resultant electrode surface. The pretilt angle of the upper aligning film 15 and the lower aligning film 16 was 87°.

The upper electrode 13 had a pattern in units of pixels each having a size of 96 μm×96 μm, in which a plurality of slit-like non-conductive portions 13b each having a width of 16 μm were arranged, and striped conductive portions 13a each having a width of 8 μm were arranged at a pitch of 24 μm. Four conductive portions 13a were formed in one pixel with the width of 96 μm. The opposing lower electrode 14 consisted of a solid conductive portion in one pixel.

The lower electrode 14 had a TFT switching element 19 and was connected to a gate line 23 and a signal line 24.

An aligning direction F of the upper aligning film 15 and an aligning direction R of the lower aligning film 16 were set to be parallel to the conductive portions of the electrodes and shifted from each other by 180°, as shown in FIG. 4. Rubbing was performed in these directions. The distance between the upper and lower substrates was set at 5 μm, thereby forming a liquid crystal cell. A nematic liquid crystal having a negative dielectric anisotropy (ZLI-4330 available from Merck Japan) was filled between the substrates to form a liquid crystal layer 20. This liquid crystal had an index anisotropy (Δn) of 0.147, and the value Δnd was 735 nm. Referring to FIGS. 5A and 5B, reference symbol M schematically represents the shape of a rod-like liquid crystal molecule.

A voltage was applied from a power supply to the obtained LCD of the present invention through the TFT 19, and the electrooptic characteristics (rectilinear propagation ratio vs. applied voltage curve) were measured. Upon application of the voltage, the electric field e having an oblique field component was formed between the electrodes. Since the direction of oblique field component changed within a small range of one pixel, the liquid crystal molecules M in the liquid crystal layer 20 changed their alignment in accordance with the electric field. Therefore, an index profile was formed on the element plane along the normal direction of the element (FIG. 5B). As a result, the rectilinear propagation ratio changes, and a change in light transmittance of the LCD can be measured. The rectilinear propagation ratio is defined by an intensity of 0th-order diffracted light/an intensity of laser beam.

To obtain the rectilinear propagation ratio vs. applied voltage curve, an He—Ne laser beam was caused to be incident on the LCD, and the rectilinear propagation ratio was measured. The spot diameter of the light beam was 1 mm. The transmitted laser beam was detected by a photodiode separated from the LCD by a distance of 20 cm. The diameter of the photodiode was 11 mm, and a light intensity at the angle $\theta \leq 1.575$ was measured. The applied voltage was gradually increased from 0V to 5V, and thereafter, decreased from 5V to 0V.

Figure 20:
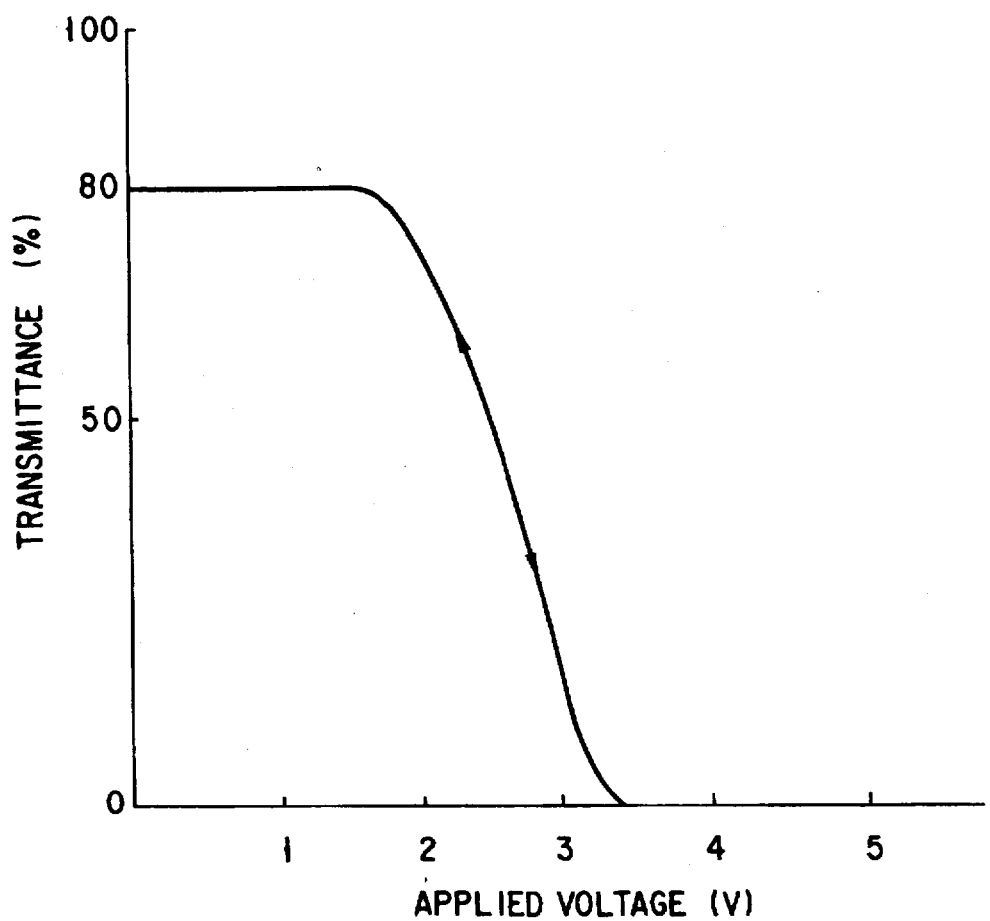
FIG. 20 is a graph showing the electrooptic characteristics of an LCD according to Example 1.

FIG. 20 is a graph showing the measurement result. In a voltage non-application state, good transmittance characteristics representing a transmittance of 80% in the pixel were observed. At a voltage of 3.2V, satisfactory scattering characteristics representing a minimum rectilinear propagation ratio of 0.4% were obtained. As is apparent from FIG. 20, no hysteresis was observed in the electrooptic characteristics. When the response times ($\tau$on, $\tau$off) were measured at applied voltages of 3.2V and 0V, very large values such as 20 msec at the rise time and 30 msec at the fall time were obtained.

EXAMPLE 2

An LCD having the same structure as that in Example 1 was obtained except that the widths of the conductive portion and the non-conductive portion of an upper electrode 13 were 3 µm and 21 µm, respectively.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.8% were obtained. No hysteresis was observed in the electrooptic characteristics. When the response times ($\tau$on, $\tau$off) were measured at applied voltages of 2.8V and 0V, very large values such as 20 msec at the rise time and 20 msec at the fall time were obtained.

EXAMPLE 3

Figure 21A:
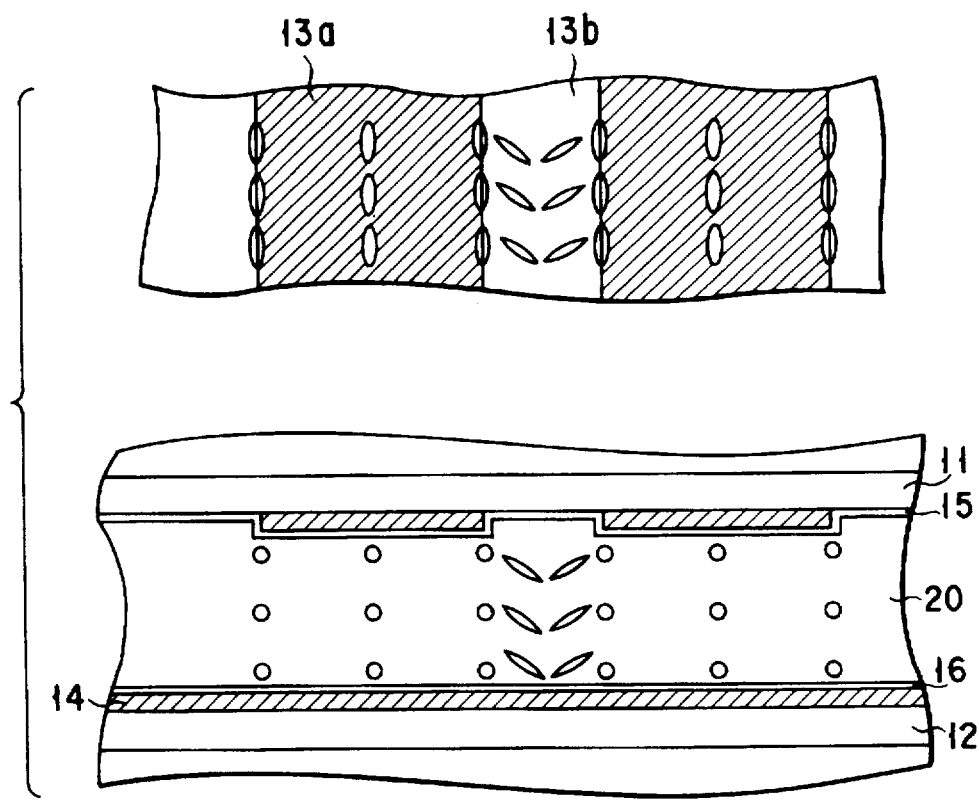
FIGS. 21A and 21B show plan and sectional views and a graph showing the index profile of an LCD according to Comparative Example 1.
Figure 21B:
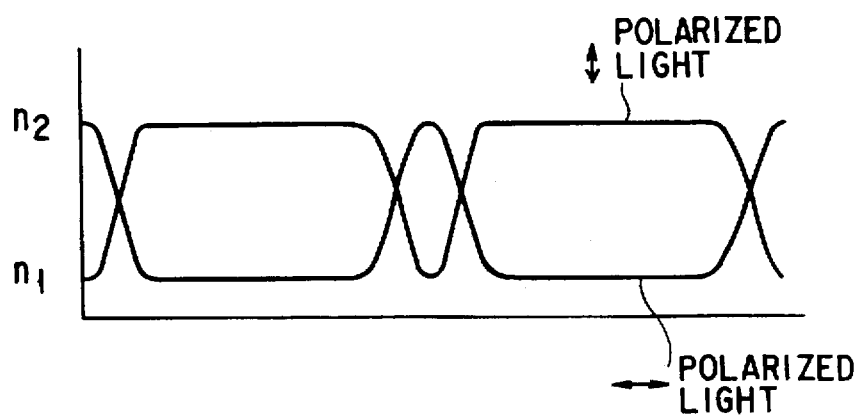

An LCD having the same structure as that in Example 1 was obtained except that the widths of the conductive portion and the non-conductive portion of an upper electrode 13 were 16 µm and 8 µm, respectively. FIG. 21A shows plan and sectional views of the liquid crystal cell in a voltage application state. FIG. 21B is a graph showing an index profile.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 2.0% were obtained. When the response times were measured at applied voltages of 2.8V and 0V, very large values such as 20 msec at the rise time and 20 msec at the fall time were obtained.

EXAMPLE 4

An LCD having the same structure as that in Example 1 was obtained except that the widths of the conductive portion and the non-conductive portion of an upper electrode 13 were 16 µm and 16 µm, respectively, and the distance between upper and lower substrates was 4.5 µm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 2.0% were obtained. When the response times were measured at applied voltages of 2.8V and 0V, very large values such as 20 msec at the rise time and 20 msec at the fall time were obtained.

EXAMPLE 5

An LCD having the same structure as that in Example 1 was obtained except that the widths of the conductive portion and the non-conductive portion of an upper electrode 13 were 18 µm and 14 µm, respectively, and the distance between the upper and lower substrates was 4.5 µm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 2.0% were obtained. When the response times were measured at applied voltages of 2.8V and 0V, very large values such as 20 msec at the rise time and 20 msec at the fall time were obtained.

EXAMPLE 6

An LCD having the same structure as that in Example 1 was obtained except that an upper electrode 13 had a pattern in which striped conductive portions each having a width of 16 µm were arranged at a pitch corresponding to a 32-µm wide non-conductive portion, two conductive portions 13a were formed in one pixel having a width of 96 µm, and the distance between upper and lower substrates was 6.0 µm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 2.0% were obtained. When the response times were measured at applied voltages of 2.8V and 0V, very large values such as 20 msec at the rise time and 20 msec at the fall time were obtained.

Comparative Example 1

An LCD having the same structure as that in Example 1 was obtained except that an upper electrode 13 had a pattern in which striped conductive portions each having a width of 28 µm were arranged at a pitch corresponding to a 20-µm wide non-conductive portion, two conductive portions 13a were formed in one pixel having a width of 96 µm, the distance between upper and lower substrates was 3.0 µm, and a nematic liquid crystal having a negative dielectric anisotropy (ZLI-4850 available from Merck Japan) was filled between the substrates.

The rectilinear propagation ratio vs. applied voltage curve of the obtained LCD was measured by the same method as in Example 1. In a voltage non-application state, good transmittance characteristics representing a transmittance of 80% in the pixel were observed. However, the minimum rectilinear propagation ratio was 60%, and no satisfactory scattering characteristics were obtained. When scattered light obtained upon incidence of polarized light was observed, no change occurred for polarized light in a direction perpendicular to the striped electrode, and the diffraction effect and the refractive effect were obtained for only polarized light in the direction of striped electrode. The liquid crystal molecules of the non-conductive portions were not twisted by the oblique field, and only the liquid crystal molecules of the conductive portions were tilted down. Therefore, the index profile was formed only in the direction of striped electrode, and no index profile was formed in a direction perpendicular to the striped electrode.

EXAMPLE 7

An LCD having the same structure as that in Example 1 was obtained except that an upper electrode 13 had a pattern in which striped conductive portions each having a width of 3 μm were arranged at a pitch corresponding to a 13-μm wide non-conductive portion, six conductive portions 13a were formed in one pixel having a width of 96 μm, aligning films (AL-3046 available from Nippon Synthesis Rubber) were formed on the surfaces of upper and lower pixel electrodes, and a nematic liquid crystal having a positive dielectric anisotropy (E-320 available from Merck Japan) was filled between the substrates.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.4% were obtained. When the response times were measured at applied voltages of 2.8V and 0V, very large values such as 20 msec at the rise time and 20 msec at the fall time were obtained.

EXAMPLE 8

An LCD having the same structure as that in Example 1 was obtained except that an upper electrode 13 had a pattern in which striped conductive portions each having a width of 10 μm were arranged at a pitch corresponding to a 30-μm wide non-conductive portion, two conductive portions 13a were formed in one pixel having a width of 96 μm, aligning films (AL-3046 available from Nippon Synthesis Rubber) were formed on the surfaces of upper and lower pixel electrodes, and a nematic liquid crystal having a positive dielectric anisotropy (ZLI-4799-100 available from Merck Japan) was filled between upper and lower substrates separated by 6 μm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.4% were obtained. When the response times were measured at applied voltages of 2.8V and 0V, very large values such as 20 msec at the rise time and 20 msec at the fall time were obtained.

EXAMPLE 9

An LCD having the same structure as that in Example 1 was obtained except that an upper electrode 13 had a pattern in which striped conductive portions each having a width of 17 μm were arranged at a pitch corresponding to a 15-μm wide non-conductive portion, two conductive portions 13a were formed in one pixel having a width of 96 μm, aligning films (AL-3046 available from Nippon Synthesis Rubber) were formed on the surfaces of upper and lower pixel electrodes, and a nematic liquid crystal having a positive dielectric anisotropy (ZLI-4799-100 available from Merck Japan) was filled between upper and lower substrates separated by 6 μm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.4% were obtained. When the response times were measured at applied voltages of 2.8V and 0V, very large values such as 20 msec at the rise time and 20 msec at the fall time were obtained.

EXAMPLE 10

An LCD having the same structure as that in Example 1 was obtained except that an upper electrode 13 had a pattern in which striped conductive portions each having a width of 2 μm were arranged at a pitch corresponding to a 14-μm wide non-conductive portion, six conductive portions 13a were formed in one pixel having a width of 96 μm, aligning films (AL-3046 available from Nippon Synthesis Rubber) were formed on the surfaces of upper and lower pixel electrodes, and a nematic liquid crystal having a positive dielectric anisotropy (ZLI-4799-100 available from Merck Japan) was filled between upper and lower substrates separated by 6 μm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.8% were obtained. When the response times were measured at applied voltages of 2.8V and 0V, very large values such as 20 msec at the rise time and 20 msec at the fall time were obtained.

Comparative Example 2

An LCD having the same structure as that in Example 1 was obtained except that an upper electrode 13 had a pattern in which striped conductive portions each having a width of 25 μm were arranged at a pitch corresponding to a 23-μm wide non-conductive portion, two conductive portions 13a were formed in one pixel having a width of 96 μm, aligning films (AL-3046 available from Nippon Synthesis Rubber) were formed on the surfaces of upper and lower pixel electrodes, and a nematic liquid crystal having a positive dielectric anisotropy (ZLI-4799-100 available from Merck Japan) was filled between upper and lower substrates separated by 4 μm.

The rectilinear propagation ratio vs. applied voltage curve of the obtained LCD was measured by the same method as in Example 1. In a voltage non-application state, good transmittance characteristics representing a transmittance of 80% in the pixel were observed. However, the minimum rectilinear propagation ratio was 50%, and no satisfactory scattering characteristics were obtained. When scattered light obtained upon incidence of polarized light was observed, no change occurred for polarized light in a direction perpendicular to the striped electrode, and the diffraction effect and the refractive effect were obtained for only polarized light in the direction of striped electrode. The liquid crystal molecules of the non-conductive portions were not twisted by the oblique field, and only the liquid crystal molecules of the conductive portions were tilted down. Therefore, the index profile was formed only in the direction of striped electrode, and no index profile was formed in a direction perpendicular to the striped electrode.

EXAMPLE 11

The LCD according to the second embodiment of the present invention will be described with reference to FIGS. 11, 12A, and 12B.

FIG. 11 is a perspective view showing the patterns of the upper and lower electrodes. FIG. 12A shows plan and sectional views of a liquid crystal cell having opposing electrodes in a voltage non-application state. FIG. 12B shows plan and sectional views of the liquid crystal cell in a voltage application state.

A stripe-like transparent upper electrode 13 consisting of ITO (Indium Tin Oxide) was formed on one surface of an upper substrate 11 consisting of glass, and an upper aligning film (AL-3046 available from Nippon Synthesis Rubber) 15 was formed on the resultant electrode surface. A striped transparent lower electrode 14 consisting of ITO was formed on one surface of the other lower substrate 12 consisting of glass, and a lower aligning film (AL-3046 available from Nippon Synthesis Rubber) 16 was formed on the resultant electrode surface. The pretilt angle of the upper aligning film 15 and the lower aligning film 16 was 3°.

The upper electrode 13 had a pattern in units of pixels each having a size of 96 µm×96 µm, in which a plurality of slit-like non-conductive portions 13b each having a width of 16 µm were arranged, and striped conductive portions 13a each having a width of 8 µm were arranged at a pitch of 24 µm. Four conductive portions 13a were formed in one pixel having a width of 96 µm.

The opposing lower electrode 14 also had a pattern in which conductive portions 14a each having a width of 8 µm and non-conductive portions 14b each having a width of 16 µm were arranged. One conductive portion 14a was formed in one pixel having a width of 96 µm.

The conductive portions of the electrodes were shifted from each other by 12 µm while the upper and lower substrates opposed each other. The conductive portion 13a or 14a of one electrode opposed the central portion of the non-conductive portion 14b or 13b of the other electrode.

The lower electrode 14 had a TFT switching element 19 and was connected to a gate line 23 and a signal line 24.

An aligning direction F of the upper aligning film 15 and an aligning direction R of the lower aligning film 16 were set to be parallel to the conductive portions of the electrodes and shifted from each other by 180°, as shown in FIG. 11. Rubbing was performed in these directions. The distance between the upper and lower substrates was set at 5 µm, thereby forming a liquid crystal cell. A nematic liquid crystal having a positive dielectric anisotropy (E320 available from Merck Japan) was filled between the substrates to form a liquid crystal layer 20. This liquid crystal had an index anisotropy (Δn) of 0.143, and the value Δnd was 715 nm. Referring to FIGS. 12A and 12B, reference symbol M schematically represents the shape of a rod-like liquid crystal molecule.

A voltage was applied from a power supply to the obtained LCD of the present invention through the TFT 19, and the electrooptic characteristics (rectilinear ratio vs. applied voltage curve) were measured. Upon application of the voltage, the electric field e having an oblique field component was formed between the electrodes. Since the direction of oblique field component changed within a small range of one pixel, the liquid crystal molecules M in the liquid crystal layer 20 changed their alignment in accordance with the electric field. Therefore, an index profile was formed on the element plane along the normal direction of the element (FIG. 12B). As a result, the rectilinear propagation ratio changes, and a change in light transmittance of the LCD can be measured.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.4% were obtained. No hysteresis was observed in the electrooptic characteristics. When the response times were measured at applied voltages of 2.8V and 0V, very large values such as 20 msec at the rise time and 30 msec at the fall time were obtained.

EXAMPLE 12

An LCD having the same structure as that in Example 11 was obtained except that an upper electrode 13 had a pattern in units of pixels, in which a plurality of slit-like non-conductive portions 13b each having a width of 18 µm were arranged, striped conductive portions 13a each having a width of 6 µm were arranged at a pitch of 24 µm, and four conductive portions 13a were formed in one pixel having a width of 96 µm, and the opposing lower electrode also had a pattern in which conductive portions 14a each having a width of 6 µm and non-conductive portions 14b each having a width of 18 µm were arranged, and four conductive portions 14a were formed in a width of 96 µm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.2% were obtained. No hysteresis was observed in the electrooptic characteristics. When the response times were measured at applied voltages of 2.8V and 0V, very large values such as 20 msec at the rise time and 20 msec at the fall time were obtained.

EXAMPLE 13

An LCD having the same structure as that in Example 11 was obtained except that an aligning direction F of an upper aligning film 15 and an aligning direction R of a lower aligning film 16 were set to be parallel to the conductive portions of electrodes, and rubbing was performed in these directions.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 0.8% were obtained. When the response times were measured at applied voltages of 2.8V and 0V, very large values such as 100 msec at the rise time and 100 msec at the fall time were obtained.

EXAMPLE 14

An LCD having the same structure as that in Example 11 was obtained except that a nematic liquid crystal having a positive dielectric anisotropy (E7 available from Merck Japan) was used as a liquid crystal composition. This liquid crystal had an index anisotropy ($\Delta n$) of 0.225, and the value $\Delta nd$ was 1,575 nm.

The rectilinear propagation ratio vs. applied voltage curve of the obtained LCD was measured by the same method as in Example 1. The measurement result is shown in FIG. 19. In a voltage non-application state, good transmittance characteristics representing a transmittance of 80% in the pixel were observed. At a voltage of 2.8V, satisfactory scattering characteristics representing a minimum rectilinear propagation ratio of 1.6% were obtained.

In this example, as shown in FIG. 22, the electrooptic characteristics have an extreme value. However, since the value $\Delta nd$ steeply changes with respect to an applied voltage, the electrooptic characteristic has a steep shape. The LCD of this example has two or more extreme values as the value $\Delta nd$, though the steep electrooptic characteristic can be obtained. In this example, the LCD had a switching element. As a result, it was proved that the LCD of the present invention could also be applied to a simple matrix using matrix driving.

EXAMPLE 15

An LCD having the same structure as that in Example 11 was obtained except that an upper electrode 13 had a pattern in units of pixels, in which a plurality of slit-like non-conductive portions 13b each having a width of 44 μm were arranged, striped conductive portions 13a each having a width of 4 μm were arranged at a pitch of 48 μm, and two conductive portions 13a were formed in one pixel having a width of 96 μm, and an opposing lower electrode 14 also had a pattern in which conductive portions 14a each having a width of 4 μm and non-conductive portions 14b each having a width of 44 μm were arranged, and four conductive portions 14a were formed in a width of 96 μm.

The rectilinear propagation ratio vs. applied voltage curve of the obtained LCD was measured by the same method as in Example 1. In a voltage non-application state, good transmittance characteristics representing a transmittance of 80% in the pixel were observed. At a voltage of 2.8V, satisfactory scattering characteristics representing a minimum rectilinear propagation ratio of 2.0% were obtained. When the response times were measured at applied voltages of 2.8V and 0V, very large values such as 20 msec at the rise time and 20 msec at the fall time were obtained.

Comparative Example 3

An upper electrode 13 had a pattern in units of pixels, in which a plurality of slit-like non-conductive portions 13b each having a width of 46 μm were arranged, and striped conductive portions 13a each having a width of 18 μm were arranged at a pitch of 64 μm. Two conductive portions 13a were formed in one pixel having a width of 96 μm. An opposing lower electrode 14 also had a pattern in which conductive portions 14a each having a width of 18 μm and non-conductive portions 14b each having a width of 46 μm were arranged. Two conductive portions 14a were formed in a width of 96 μm. The conductive portions of the electrodes are shifted from each other by 32 μm while the upper and lower substrates oppose each other. The conductive portion 13a or 14a of one electrode opposed the central portion of the non-conductive portion 14b or 13b of the other electrode. The distance between the upper and lower substrates was set at 4 μm, thereby forming a liquid crystal cell. An LCD having the same structure as that in Example 11 was obtained except that a nematic liquid crystal having a positive dielectric anisotropy (ZLI-1844 available from Merck Japan) was filled between the substrates.

The rectilinear propagation ratio vs. applied voltage curve of the obtained LCD was measured by the same method as in Example 1. In a voltage non-application state, good transmittance characteristics representing a transmittance of 80% in the pixel were observed. However, the minimum rectilinear propagation ratio was 50%, and no satisfactory scattering characteristics were obtained.

In the LCD of this example, since the width of a region SS where both the substrates had non-conductive portions was 14 μm, and the interelectrode distance was 4 μm, SS/D=3.5 which fell outside the range of claim 6. The field component consists of only a transverse component, and a change in liquid crystal molecules of the non-conductive portions in the direction of thickness of the liquid crystal layer is small, so no diffraction effect can be obtained.

EXAMPLE 16

By using the LCD obtained in Example 11 together with color filters, a projection-type color liquid crystal display apparatus was manufactured. FIG. 13 shows the arrangement. A light beam from a metal halide light source 25 was collimated through a schlieren lens 26, transmitted through a LCD 27 and a condenser lens 28, and projected on a screen 31 through a projection lens 30. An image input to the LCD 27 by a driving unit and a video signal output unit 33 was enlarged and displayed on the screen 31.

The LCD of the present invention could control rectilinear propagation or scattering of the optical path of a parallel light beam by an electric field. Therefore, when the schlieren optical system was used, an arbitrary image could be displayed on the screen 31. In this example, to project only a rectilinear component of the parallel light incident on the LCD 27, a stop 29 having a diameter of 5 mm was arranged at the focal position of the condenser lens 28 to shield light scattered by the LCD 27.

When the obtained projection-type liquid crystal display apparatus was used to input a video signal to the cell for pattern display, and an image with a size about 30 times that of the cell was projected, a contrast ratio of 400:1 was obtained. In addition, very bright display was realized.

EXAMPLE 17

Three LCDs obtained in Example 11 were used to manufacture a projection-type liquid crystal display apparatus. FIG. 17 shows the arrangement. In this example, a white light source 37 having three R, G, and B wavelengths was used as a light source. A light beam from this light source is split into light components having R, G, and B wavelengths by using dichroic mirrors 34 and 35 and total reflecting mirrors 36, and these light components are incident on three LCDs 27a to 27c, respectively. With this arrangement, the optical paths can be controlled in units of wavelengths. Therefore, color display can be realized. The dichroic mirror 34 transmits a red wavelength and totally reflects green and blue wavelengths. The dichroic mirror 35 transmits a blue wavelength and totally reflects green and red wavelengths.

When the obtained liquid crystal display apparatus was used to input a full-color video signal image to the cell for pattern display, and an image with a size about 30 times that of the cell was projected, a contrast ratio of 200:1 was obtained. In addition, very bright display was realized.

EXAMPLE 18

A liquid crystal display apparatus of this example was obtained by using, in the apparatus of Example 16, an LCD having the same structure as that in Example 3 except that a positive nematic liquid crystal composition (ZLI-4792 available from Merck Japan) was used, and the distance between an upper and lower substrates was set at 6.6 µm for an LCD 27a, 4.57 µm for an LCD 27b, and 5.68 µm for an LCD 27c. In this example, by changing interelectrode distances for the three LCDs, the value And is caused to coincide with the R, G, and B wavelengths of a source light.

When the obtained liquid crystal display apparatus was used to input a full-color video signal image to the cell for pattern display, and an image with a size about 30 times that of the cell was projected, a contrast ratio of 400:1 was obtained. In addition, very bright display was realized.

EXAMPLE 19

FIG. 18 is a sectional view of an LCD used for the projection-type liquid crystal display apparatus of this example. Microlenses 40 were bonded on the light source side of a lower substrate 12 of the LCD of Example 3 using the TFT while positioning was performed such that each lens corresponded to an opening portion of the liquid crystal. A projection-type liquid crystal display apparatus as in Example 6 was manufactured by using the obtained LCD. As compared to the projection-type liquid crystal display apparatus using no microlens, the transmittance of the entire element was increased by 80%. The contrast ratio was 200:1.

EXAMPLE 20

FIG. 19 is a sectional view of an LCD used for the projection-type liquid crystal display apparatus of this example. Two microlenses (available from Nippon Electric Glass) were bonded on the light source side of a lower substrate 12 of the LCD of Example 3 using the TFT while positioning was performed such that each lens corresponded to an opening portion of the liquid crystal. A projection-type liquid crystal display apparatus as in Example 6 was manufactured by using the obtained LCD. As compared to the projection-type liquid crystal display apparatus using no microlens, the transmittance of the entire element was increased by 80%. The contrast ratio was 400:1.

As has been described above, in the LCD according to the first embodiment of the present invention, an oblique field is applied in two or more directions to tilt up or down the liquid crystal molecules in the direction of an electric field. The refractive lens effect and the diffraction grating effect can be obtained, thereby realizing a light scattering state. As a result, an LCD excellent in gradation display properties because of a low driving voltage, a high brightness level, and a high contrast ratio, and having a dependency on very wide viewing angle, which prevents display inversion in gradation display, can be obtained.

In the LCD according to the first embodiment, when the values RS, EE, and D, and the relations therebetween are set within predetermined ranges, the above characteristics can be further improved.

In the LCD according to the second embodiment of the present invention, an oblique field is applied in two or more directions to tilt up or down the liquid crystal molecules in the direction of an electric field. The refractive lens effect and the diffraction grating effect can be obtained, thereby realizing a light scattering state. As a result, an LCD excellent in gradation display properties because of a low driving voltage, a high brightness level, and a high contrast ratio, and having a dependency on very wide viewing angle, which prevents display inversion in gradation display, can be obtained.

In the second LCD, when the values RE, FE, SS, and D, and the relations therebetween are set within ranges of claims 7 to 9, the above characteristics can be further improved.

When the values are set within ranges of claims 10 to 12 in association with the properties of the liquid crystal composition, the characteristics of the first or second LCD can be further improved.

The liquid crystal display apparatus of the present invention can realize very bright display at a high contrast ratio by using the first or second LCD for a projection-type liquid crystal display apparatus. In addition, when a lens layer is formed, the contrast ratio and the brightness level can be further increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:
    a first substrate supporting a plurality of pixels, each having an electrode;
    a second substrate having an electrode and arranged such that said electrode of said first substrate opposes said electrode of said second substrate;
    a nematic liquid crystal composition layer held between said first and second substrates; and
    means for aligning liquid crystal molecules of the nematic liquid crystal composition in one direction on surfaces of said first and second substrates,
    wherein said electrode of the first substrate in each pixel includes a plurality of stripe-shaped conductive layers each having a width not more than 50 µm, a distance between said conductive layers being not more than 50 µm, and at least two of said conductive layers being electrically connected in at least part of an area in said pixel,
    said electrode of the second substrate consists of a continuous conductive film, and
    a distance RS between said conductive layers and a distance D between said electrode of said first substrate and said electrode of second substrate satisfy the following inequality:

$$\tan(\pi/9) \leq RS/2D \leq \tan(7\pi/18).$$

2. A device according to claim 1, wherein the distance RS and the distance D satisfy the following inequality:

$$\tan(\pi/4) \leq RS/2D \leq \tan(\pi/18).$$

3. A device according to claim 1, wherein a width EE of said conductive layer and the distance D satisfy the following inequality:

$D/2 \leq EE \leq 3D$.

4. A device according to claim 1, wherein, when the liquid crystal composition has a negative dielectric anisotropy, a width EE of said conductive layer and the distance RS satisfy an inequality $RS/3 \leq EE \leq 1.1 \times RS$, and when the liquid crystal composition has a positive dielectric anisotropy, the width EE of said conductive layer and the distance RS satisfy an inequality $0 \leq EE \leq RS$.

5. A device according to claim 1, wherein a width EE of said conductive layer and the distance RS satisfy the following inequality:

$2.5 \mu m \leq EE + RS \leq 36 \mu m$.

6. A device according to claim 1, wherein a liquid crystal molecular alignment of the liquid crystal composition is one of a homogeneous alignment in which a longitudinal liquid crystal molecular axis is set parallel to a direction of a stripe of said stripe-shaped conductive layers and a vertical alignment in which the longitudinal liquid crystal molecular axis is vertically set between said first and second substrates.

7. A device according to claim 6, wherein incident light consists of a visible range, and a product of an index anisotropy $\Delta n$ of the liquid crystal composition and a thickness d of a liquid crystal layer satisfy the following relation:

$350 \text{ nm} \leq \Delta n \cdot d \leq 1050 \text{ nm}$.

8. A device according to claim 6, wherein incident light is monochromatic light having a band width not more than 100 nm, and a product of an index anisotropy $\Delta n$ of the liquid crystal composition and a thickness d of a liquid crystal layer satisfy the following relation:

$(\lambda - 50)/2 \text{ nm} \leq \Delta n \cdot d \leq 2(\lambda + 50) \text{ nm}$ where $\lambda$ is the center wavelength of the monochromatic light.

9. A liquid crystal display apparatus comprising:
   said liquid crystal display device according to claim 1;
   means for causing light to have an angle less than 10 deg with respect to a normal direction of an element plane and to be incident on said liquid crystal display device;
   means for controlling the incident light by said liquid crystal display device; and
   an optical system for projecting light in a same direction of propagation as directions of the controlled light.

10. An apparatus according to claim 9, wherein a plurality of liquid crystal devices are used as said liquid crystal display device, and said means for causing the light to have an angle less than 10 deg with respect to the normal direction of said element plane and to be incident is means for causing light beams obtained as spectral components excluding at least one of red, blue, and green wavelengths to be incident on said plurality of liquid crystal display devices, respectively.

11. An apparatus according to claim 9, further comprising a layer having the same optical function as that of a convex lens and arranged on a substrate on an outer rear surface on the incident light side of said liquid crystal display device in correspondence with each pixel of said liquid crystal display device.

12. An apparatus according to claim 11, further comprising a layer having the same optical function as that of a convex lens or a concave lens arranged between an electrode of said substrate on the incident light side of said liquid crystal display device and said layer having the same optical function as that of a convex lens, and wherein a light beam transmitted through said layer having the same optical function as that of a convex lens and said layer having the same optical function as that of a convex lens or a concave lens has an angle with respect to the normal direction of a plane of said liquid crystal display device plane, which angle is 0.9 to 1.1 times that of the incident light with respect to the normal direction of said plane of said liquid crystal display device.

13. A projection-type display apparatus comprising:
   a display panel consisting of said liquid crystal display device according to claim 1 and having an optical modulation layer for controlling a light transmittance;
   a light source optical system for guiding a source light beam from a light source to said display panel; and
   a projection optical system for projecting a modulated light beam optically modulated by said display panel onto a screen.

14. A liquid crystal display device comprising:
   a first substrate supporting a plurality of pixels, each having an electrode;
   a second substrate having an electrode and arranged such that said electrode of said first substrate opposes said electrode of said second substrate;
   a nematic liquid crystal composition layer held between said first and second substrates; and
   means for aligning liquid crystal molecules of the nematic liquid crystal composition in one direction on surfaces of said first and second substrates,
   wherein said electrode of the first substrate in each pixel includes a plurality of first stripe-shaped conductive layers each having a width not more than 50 μm, a distance between said first conductive layers being not more than 50 μm, and at least two of said conductive layers are electrically connected in at least part of an area in said pixel,
   said electrode of said second substrate in each pixel includes a plurality of second conductive layers each having a width not more than 50 μm, a distance between said conductive layers being not more than 50 μm, said second conductive layers extending in the same direction as that of said first conductive layers, and at least two of said plurality of second conductive portions being electrically connected in at least part of an area in said pixel,
   said first conductive layers and said second conductive layers are staggered from each other in a direction of width without opposing each other,
   said liquid crystal composition layer includes a layer portion FE sandwiched between each first conductive layer and part of a corresponding portion between said second conductive layers, a layer portion SS adjacent to said layer portion FE and sandwiched between part of a portion between said first conductive layers and part of a corresponding portion between said second conductive layers, and a layer portion RE adjacent to said layer portion SS and sandwiched between part of a portion between said first conductive layers and a corresponding one of said second conductive layers are periodically repeated in an order of FE, SS, RE, FE, SS, RE, . . . , and
   the width SS of said layer portion SS and a distance D between said electrode of said first substrate and said electrode of second substrate satisfy the following inequality:

$\tan(\pi/9) \leq SS/D - \tan(7\pi/18)$.

15. A device according to claim 14, wherein the width RE of said layer portion RE, the width FE of said layer portion FE, and the distance D satisfy the following inequalities:

$D/2 \leq RE \leq 3D,$ and $D/2 \leq FE \leq 3D.$

16. A device according to claim 14, wherein the width RE of said layer portion RE, the width SS of said layer portion SS, and the width FE of said layer portion FE satisfy the following inequalities:

$0.9 \times SS \leq RE \leq 1.1 \times SS,$ and $0.9 \times SS \leq FE \leq 1.1 \times SS.$ 17. A devices according to claims 14, wherein the width RE of said layer portion RE, the width SS of said layer portion SS, and the width FE of said layer portion FE satisfy the following inequalities:

$2.5 \ \mu m \leq RE + SS \leq 36 \ \mu m,$ and $2.5 \ \mu m \leq FE + SS \leq 36 \ \mu m.$ 18. A device according to claim 14, wherein a liquid crystal molecular alignment of the liquid crystal composition is one of a homogeneous alignment in which a longitudinal liquid crystal molecular axis is set parallel to a direction of a stripe of said conductive layers and a vertical alignment in which the longitudinal liquid crystal molecular axis is vertically set between said first and second substrates.

19. A device according to claim 14, wherein incident light consists of a visible range, and a product of an index anisotropy $\Delta n$ of the liquid crystal composition and a thickness d of a liquid crystal layer satisfy the following relation:

$350 \ nm \leq \Delta n \cdot d \leq 1050 \ nm.$

20. A device according to claim 18, wherein incident light is monochromatic light having a band width not more than 100 nm, and a product of an index anisotropy $\Delta n$ of the liquid crystal composition and a thickness d of a liquid crystal layer satisfy the following relation:

$(\lambda - 50)/2 \ nm \leq \Delta n \cdot d \leq 2(\lambda + 50) \ nm$ where $\lambda$ is the center wavelength of the monochromatic light.

21. A liquid crystal display apparatus comprising:

said liquid crystal display device according to claim 14;

means for causing light to have an angle less than 10 deg with respect to a normal direction of an element plane and to be incident on said liquid crystal display device;

means for controlling the incident light by said liquid crystal display device; and an optical system for projecting light in a same direction of propagation as directions of the controlled light.

22. An apparatus according to claim 21, wherein a plurality of liquid crystal devices are used as said liquid crystal display device, and said means for causing the light to have an angle less than 10 deg with respect to the normal direction of said device plane and to be incident is means for causing light beams obtained as spectral components excluding at least one of red, blue, and green wavelengths to be incident on said plurality of liquid crystal display devices, respectively.

23. An apparatus according to claim 21, further comprising a layer having the same optical function as that of a convex lens and arranged on a substrate on an outer rear surface on the incident light side of said liquid crystal display device in correspondence with each pixel of said liquid crystal display device.

24. An apparatus according to claim 23, further comprising a layer having the same optical function as that of a convex lens or a concave lens arranged between an electrode of said substrate on the incident light side of said liquid crystal display device and said layer having the same optical function as that of a convex lens, and wherein a light beam transmitted through said layer having the same optical function as that of a convex lens and said layer having the same optical function as that of a convex lens or a concave lens has an angle with respect to the normal direction of a plane of said liquid crystal display device plane, which angle is 0.9 to 1.1 times that of the incident light with respect to the normal direction of said plane of said liquid crystal display device.

* * * * *